United States Patent
Kusunoki et al.

(10) Patent No.: US 11,817,726 B2
(45) Date of Patent: *Nov. 14, 2023

(54) POWER FEEDING DEVICE, ELECTRONIC DEVICE, AND OPERATION METHOD OF POWER FEEDING DEVICE

(71) Applicant: SEMICONDUCTOR ENERGY LABORATORY CO., LTD., Atsugi (JP)

(72) Inventors: Koji Kusunoki, Kanagawa (JP); Toshiyuki Isa, Kanagawa (JP); Akihiro Chida, Kanagawa (JP); Kouhei Toyotaka, Kanagawa (JP); Ryota Tajima, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,394

(22) Filed: Aug. 2, 2022

(65) Prior Publication Data

US 2022/0399726 A1 Dec. 15, 2022

Related U.S. Application Data

(63) Continuation of application No. 16/753,872, filed as application No. PCT/IB2018/058280 on Oct. 24, 2018, now Pat. No. 11,431,199.

(30) Foreign Application Priority Data

Nov. 2, 2017 (JP) ................................. 2017-213048

(51) Int. Cl.
*H02J 7/00* (2006.01)
*H02J 50/10* (2016.01)
(Continued)

(52) U.S. Cl.
CPC ........ *H02J 7/0013* (2013.01); *H02J 7/00032* (2020.01); *H02J 7/00034* (2020.01);
(Continued)

(58) Field of Classification Search
CPC ...................................................... H02J 7/0048
(Continued)

(56) References Cited

U.S. PATENT DOCUMENTS 5,416,702 A * 5/1995 Kitagawa .............. H02J 7/0031
315/80
5,714,866 A 2/1998 Dilip et al.
(Continued)

FOREIGN PATENT DOCUMENTS

CN 101924385 A 12/2010
CN 102648106 A 8/2012
(Continued)

OTHER PUBLICATIONS

International Search Report (Application No. PCT/IB2018/058280) dated Feb. 12, 2019.
(Continued)

*Primary Examiner* — Edward Tso
*Assistant Examiner* — Ahmed H Omar
(74) *Attorney, Agent, or Firm* — NIXON PEABODY LLP; Jeffrey L. Costellia

(57) ABSTRACT

Deterioration of a storage battery included in an electronic device is reduced. Power consumption of an electronic device is reduced. A power feeding device having excellent performance is provided. The power feeding device includes a power feeding coil, a control circuit, and a neural network and has a function of charging a storage battery with a wireless signal supplied by the power feeding coil. The control circuit has a function of estimating a remaining capacity value of the storage battery, the control circuit has
(Continued)

a function of supplying the estimated remaining capacity value to the neural network, the neural network outputs a value corresponding to the supplied remaining capacity value to the control circuit, the control circuit determines a charge condition for the storage battery on the basis of the value output by the neural network, and the power feeding device has a function of charging the storage battery under the determined charge condition.

2 Claims, 21 Drawing Sheets

(51) Int. Cl.
  *H02J 7/04* (2006.01)
  *H02J 50/40* (2016.01)
  *H01F 27/34* (2006.01)
  *H02J 50/12* (2016.01)
  *H02J 7/02* (2016.01)

(52) U.S. Cl.
  CPC ............... *H02J 7/04* (2013.01); *H02J 50/10* (2016.02); *H02J 50/40* (2016.02); *H02J 50/402* (2020.01); *H01F 27/346* (2013.01); *H02J 7/0048* (2020.01); *H02J 7/02* (2013.01); *H02J 50/12* (2016.02)

(58) Field of Classification Search
  USPC .......................................................... 320/132
  See application file for complete search history.

(56) References Cited

U.S. PATENT DOCUMENTS

| | | | | |
|---|---|---|---|---|
| 6,016,047 A | * | 1/2000 | Notten | G01R 31/367 320/128 |
| 6,064,180 A | * | 5/2000 | Sullivan | B60L 58/10 320/132 |
| 8,234,087 B2 | * | 7/2012 | Majima | G01R 31/374 702/182 |
| 8,305,036 B2 | | 11/2012 | Toya et al. | |
| 8,664,914 B2 | | 3/2014 | Toya et al. | |
| 8,712,619 B2 | | 4/2014 | Kusumi et al. | |
| 8,786,252 B2 | | 7/2014 | Toya et al. | |
| 9,124,106 B2 | | 9/2015 | Toya et al. | |
| 9,312,711 B2 | | 4/2016 | Toya et al. | |
| 9,502,920 B2 | | 11/2016 | Kamata | |
| 10,141,069 B2 | | 11/2018 | Ikeda et al. | |
| 10,340,739 B2 | | 7/2019 | Kamata | |
| 2008/0234956 A1 | | 9/2008 | Mizuno et al. | |
| 2009/0153098 A1 | | 6/2009 | Toya et al. | |
| 2012/0283902 A1 | | 11/2012 | Kusumi et al. | |
| 2015/0180241 A1 | | 6/2015 | Petersen et al. | |
| 2016/0142054 A1 | * | 5/2016 | Mojumder | G06F 1/3206 327/333 |
| 2017/0288414 A1 | * | 10/2017 | Klein | B60L 58/16 |
| 2017/0373500 A1 | * | 12/2017 | Shafi | G05B 13/027 |
| 2018/0026454 A1 | * | 1/2018 | Belkacem-Boussaid | G01R 31/371 702/63 |
| 2018/0083461 A1 | * | 3/2018 | Ravi | G06F 1/28 |
| 2018/0136285 A1 | * | 5/2018 | You | G01R 31/392 |
| 2019/0025379 A1 | * | 1/2019 | Pajovic | G01R 31/367 |
| 2019/0164620 A1 | | 5/2019 | Ikeda et al. | |
| 2020/0176069 A1 | | 6/2020 | Ikeda et al. | |
| 2021/0280920 A1 | * | 9/2021 | Rinaldo | H01M 10/425 |

FOREIGN PATENT DOCUMENTS

| | | |
|---|---|---|
| CN | 104009005 A | 8/2014 |
| EP | 2502774 A | 9/2012 |
| JP | 11-146569 A | 5/1999 |
| JP | 2007-240308 A | 9/2007 |
| JP | 2009-247194 A | 10/2009 |
| JP | 2012-029470 A | 2/2012 |
| JP | 2013-128394 A | 6/2013 |
| JP | 2013-240276 A | 11/2013 |
| JP | 2014-135884 A | 7/2014 |
| JP | 2015-080408 A | 4/2015 |
| JP | 2015-095983 A | 5/2015 |
| JP | 2016-219011 A | 12/2016 |
| WO | WO-2011/061809 | 5/2011 |
| WO | WO-2014/018972 | 1/2014 |
| WO | WO-2017/141141 | 8/2017 |

OTHER PUBLICATIONS

Written Opinion (Application No. PCT/IB2018/058280) dated Feb. 12, 2019.

\* cited by examiner $a = x_1 w_1 + x_2 w_2 + b$

US 11,817,726 B2

POWER FEEDING DEVICE, ELECTRONIC DEVICE, AND OPERATION METHOD OF POWER FEEDING DEVICE

TECHNICAL FIELD

One embodiment of the present invention relates to a power feeding device. Another embodiment of the present invention relates to a power feeding device that has a function of wireless communication. Another embodiment of the present invention relates to an electronic device that uses a storage battery.

Another embodiment of the present invention relates to a semiconductor device.

Another embodiment of the present invention relates to a neural network and a power feeding device that uses the neural network. Another embodiment of the present invention relates to an electronic device that uses a neural network.

In this specification and the like, a semiconductor device generally means a device that can function by utilizing semiconductor characteristics. A display device, a light-emitting device, a memory device, an electro-optical device, a power storage device, a semiconductor circuit, and an electronic device include a semiconductor device in some cases.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter.

BACKGROUND ART

A technique of feeding power to an electronic device or other objects in a state where the object is not in contact with a power supply source, such as wireless power feeding, is commonly used. Wireless power feeding enables easy feeding of power without connection to a terminal. Patent Document 1 discloses an example of performing power feeding and communication by utilizing a magnetic resonance method and further discloses an example of a power feeding system that can be used between a power transmission device and each power reception device included in a mobile phone or a portable information terminal.

In recent years, transistors using oxide semiconductors or metal oxides in their channel formation regions (Oxide Semiconductor transistors, hereinafter referred to as OS transistors) have attracted attention. The off-state current of an OS transistor is extremely low. Applications that employ OS transistors to utilize their extremely low off-state currents have been proposed. For example, Patent Document 2 discloses an example in which an OS transistor is used for learning in a neural network.

REFERENCES

Patent Document

[Patent Document 1] Japanese Published Patent Application No. 2013-128394
[Patent Document 2] Japanese Published Patent Application No. 2016-219011

SUMMARY OF THE INVENTION

Problems to be Solved by the Invention

An object of one embodiment of the present invention is to reduce deterioration of a storage battery included in an electronic device. Another object of one embodiment of the present invention is to reduce power consumption of an electronic device.

Another object of one embodiment of the present invention is to provide a power feeding device having excellent performance. Another object of one embodiment of the present invention is to provide a power feeding device that can suppress deterioration of a storage battery. Another object of one embodiment of the present invention is to provide a power feeding device that can efficiently charge a plurality of storage batteries. Another object of one embodiment of the present invention is to provide an operation method of a power feeding device, by which deterioration of a storage battery can be suppressed.

Another object of one embodiment of the present invention is to provide a novel semiconductor device. Another object of one embodiment of the present invention is to provide a novel system.

Note that the descriptions of a plurality of objects do not mutually preclude the existence. One embodiment of the present invention does not necessarily achieve all of these objects. Objects other than those listed above will be apparent from the description of the specification, the drawings, the claims, and the like, and such objects could be objects of one embodiment of the present invention.

Means for Solving the Problems

One embodiment of the present invention is a power feeding device including a power feeding coil, a control circuit, and a neural network. The power feeding device has a function of charging a storage battery with a wireless signal supplied by the power feeding coil, the storage battery has a function of receiving the wireless signal from the power feeding coil, the control circuit has a function of estimating a remaining capacity value of the storage battery, the control circuit has a function of supplying the estimated remaining capacity value to the neural network, the neural network outputs a value corresponding to the supplied remaining capacity value to the control circuit, the control circuit determines a charge condition for the storage battery on the basis of the value output by the neural network, and the power feeding device has a function of charging the storage battery under the determined charge condition.

Another embodiment of the present invention is a power feeding device including a power feeding coil, a control circuit, and a neural network. The power feeding device has a function of charging a first storage battery and a second storage battery with a wireless signal supplied by the power feeding coil, the first storage battery and the second storage battery have a function of receiving the wireless signal from the power feeding coil, the control circuit has a function of estimating a remaining capacity value of the first storage battery and a remaining capacity value of the second storage battery, the control circuit has a function of supplying the estimated remaining capacity value of the first storage battery and the estimated remaining capacity value of the second storage battery to the neural network, the neural network outputs a first value corresponding to the supplied remaining capacity value of the first storage battery and a second value corresponding to the remaining capacity value of the second storage battery to the control circuit, and the control circuit has a function of selecting either the first storage battery or the second storage battery on the basis of the first value and the second value and charging the selected storage battery.

Another embodiment of the present invention is a system which includes an electronic device including a storage battery and a power feeding device. The storage battery is charged by the power feeding device, the power feeding device includes a power feeding coil, a control circuit, and a neural network, the power feeding device has a function of charging the storage battery with a wireless signal supplied by the power feeding coil, the control circuit has a function of estimating a remaining capacity value of the storage battery, wherein the control circuit has a function of supplying the estimated remaining capacity value to the neural network, the neural network outputs a value corresponding to the supplied remaining capacity value to the control circuit, the control circuit determines a charge condition for the storage battery on the basis of the output value, and the power feeding device has a function of charging the storage battery under the determined charge condition.

Another embodiment of the present invention is an operation method of a power feeding device comprising a power feeding coil, a control circuit, and a neural network. A plurality of storage batteries are provided in the neighborhood of the power feeding device, each of the plurality of storage batteries has an individual identification number, the power feeding device has a function of charging at least one of the plurality of storage batteries with a wireless signal supplied by the power feeding coil. A first step in which the control circuit estimates a remaining capacity value of each of the plurality of storage batteries; a second step in which the control circuit supplies each of the estimated remaining capacity values to the neural network; a third step in which the neural network outputs values corresponding to the respective remaining capacity values to the control circuit; a fourth step in which the control circuit selects which of the plurality of storage batteries to charge on the basis of the output values and charges the selected storage battery; and a fifth step in which the control circuit stops charging of the selected storage battery, are included. The first step to the fifth step are one cycle, and the one cycle is repeated a plurality of times. A set of data in which the individual identification number and the remaining capacity value estimated in the first step are linked with each other is accumulated in the control circuit in the second step every repeated cycle, and a charge condition is determined using the accumulated set of data in the fourth step. Furthermore, it is preferable that the control circuit measure time of a clock included in the power feeding device or the storage battery in the first step and that a set of data in which the individual identification number, the remaining capacity value estimated in the first step, and the time are linked with each other be accumulated in the control circuit in the second step. Moreover, the control circuit preferably includes a memory, and it is preferable that the set of data in which the individual identification number and the remaining capacity value estimated in the first step are linked with each other be accumulated in the memory in the second step and that the memory include a transistor including a metal oxide containing indium in a channel formation region.

Effect of the Invention

With one embodiment of the present invention, deterioration of a storage battery included in an electronic device can be reduced. Furthermore, with one embodiment of the present invention, power consumption of an electronic device can be reduced.

Furthermore, with one embodiment of the present invention, a power feeding device having excellent performance can be provided. Furthermore, with one embodiment of the present invention, a power feeding device that can suppress deterioration of a storage battery can be provided. Furthermore, with one embodiment of the present invention, a power feeding device that can efficiently charge a plurality of storage batteries can be provided. Furthermore, with one embodiment of the present invention, an operation method of a power feeding device, by which deterioration of a storage battery can be suppressed, can be provided.

Furthermore, with one embodiment of the present invention, a novel semiconductor device can be provided. Furthermore, with one embodiment of the present invention, a novel system can be provided.

Note that the descriptions of these effects do not disturb the existence of other effects. One embodiment of the present invention does not have to have all of these effects. Effects other than these will be apparent from the description of the specification, the drawings, the claims, and the like, and effects other than these can be derived from the description of the specification, the drawings, the claims, and the like.

MODE FOR CARRYING OUT THE INVENTION

Figure 1:
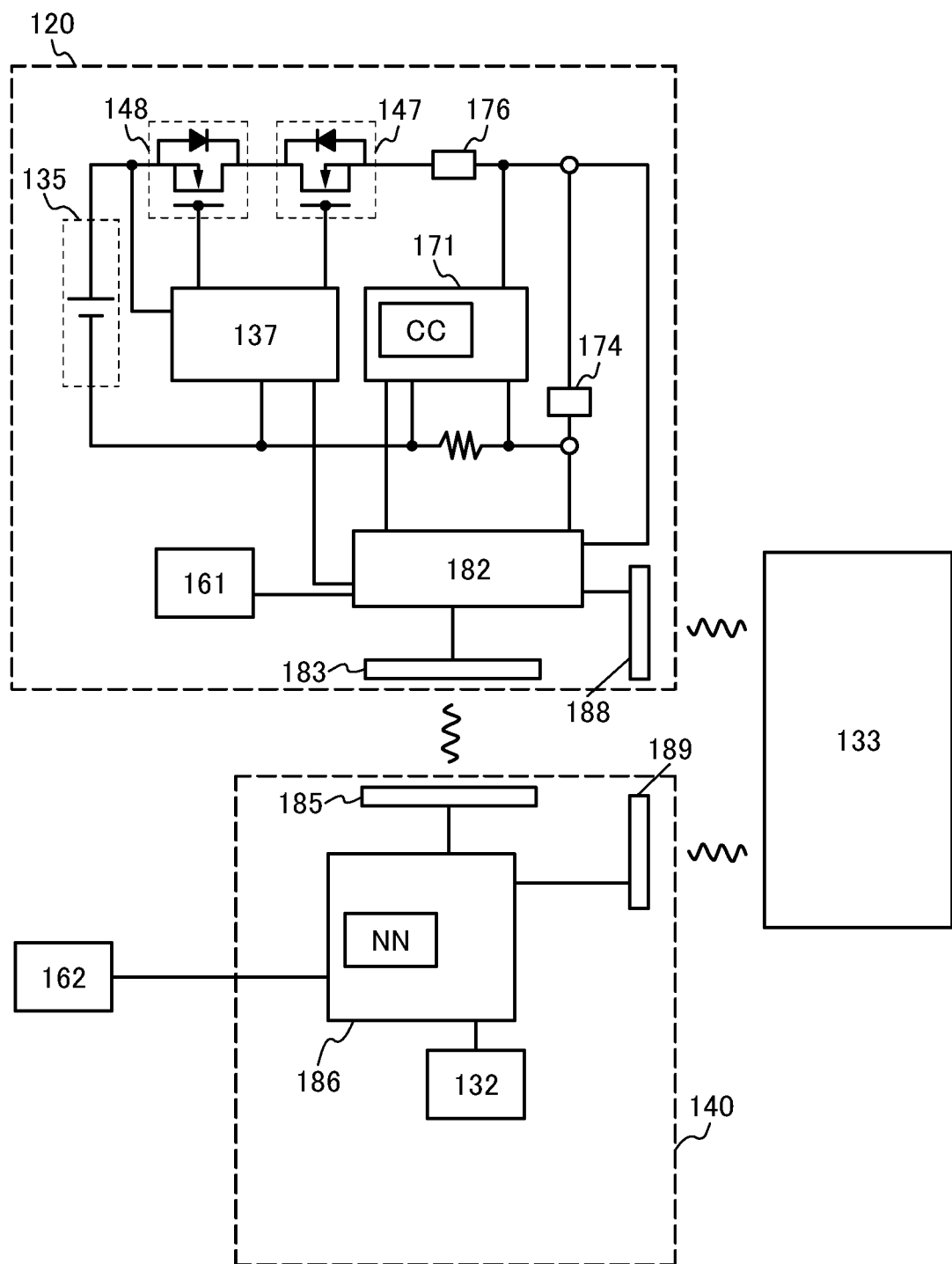
FIG. 1 A view illustrating an example of an electronic device, a power feeding device, and a block.

Hereinafter, embodiments will be described with reference to drawings. Note that the embodiments can be implemented with many different modes, and it will be readily appreciated by those skilled in the art that modes and the details of the embodiments can be changed in various ways without departing from the spirit and scope thereof. Thus, the present invention should not be interpreted as being limited to the following description of the embodiments.

In the drawings, the size, the layer thickness, or the region is exaggerated for clarity in some cases. Therefore, the size, the layer thickness, or the region is not limited to the illustrated scale. Note that the drawings schematically illustrate ideal examples, and embodiments of the present invention are not limited to shapes, values, or the like shown in the drawings.

In this specification, the embodiments described below can be combined as appropriate. In addition, in the case where a plurality of structure examples are described in one embodiment, the structure examples can be combined with each other as appropriate.

In this specification, a neural network refers to a general model that is modeled on a biological neural network, determines the connection strength of neurons by learning, and has the capability of solving problems. A neural network includes an input layer, an intermediate layer (also referred to as a hidden layer), and an output layer.

In describing a neural network in this specification, to determine a connection strength of neurons (also referred to as a weight coefficient) from existing information is sometimes referred to as "learning."

Moreover, in this specification, to draw a new conclusion from a neural network formed using connection strengths obtained by learning is sometimes referred to as "inference."

In this specification and the like, a transistor including an oxide semiconductor or a metal oxide in its channel formation region is referred to as an Oxide Semiconductor transistor or an OS transistor.

Embodiment 1

In this embodiment, a power feeding device of one embodiment of the present invention will be described.

Power Feeding Device

Figure 2A:
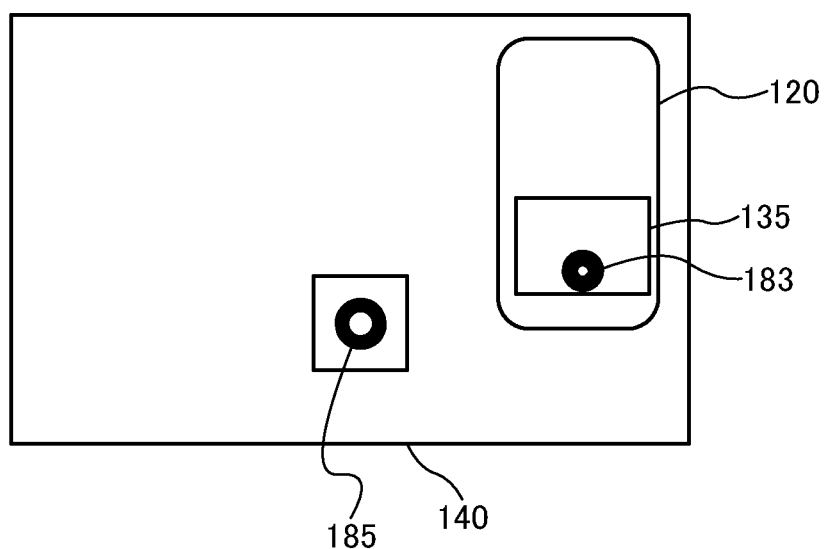
FIGS. 2A-2B A top view and a perspective view of an electronic device and a power feeding device.
Figure 2B:
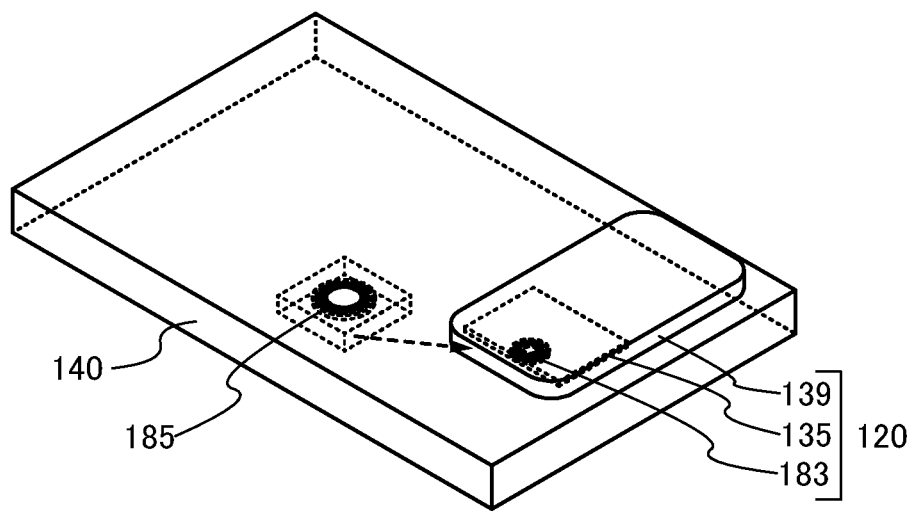

FIG. 1 illustrates an example of a block diagram of each of a power feeding device 140 and an electronic device 120 having a function of wirelessly communicating with the power feeding device 140. Furthermore, FIG. 2(A) illustrates an example of a top view of the power feeding device 140 and the electronic device 120, and FIG. 2(B) illustrates an example of a perspective view corresponding to FIG. 2(A).

The power feeding device 140 includes a coil 185, a control circuit 186, and a memory 132. The control circuit 186 includes a neural network NN.

In the neural network NN, an OS transistor described later can be used. The use of the OS transistor allows a product-sum operation circuit to be formed of fewer transistors as described later. Thus, the circuit scale of the neural network NN can be reduced. Furthermore, with the structure described later, higher operation accuracy and lower power consumption of the neural network of one embodiment of the present invention can be achieved.

For example, power is supplied from an adapter 162 to the control circuit 186 of the power feeding device 140. The adapter 162 has a function of converting AC power to DC power and then outputting the DC power, for example. The adapter 162 may be referred to as an AC/DC adapter. The control circuit 186 may include a power management IC.

The electronic device 120 illustrated in FIG. 1 includes a storage battery 135, a control circuit 182, and a coil 183. Furthermore, the electronic device 120 preferably includes a protection circuit 137, a charge control circuit 171, a sensor element 174, a fuse 176, a transistor 147, a transistor 148, and the like. The charge control circuit 171 may include a coulomb counter CC. A block 161 included in the electronic device 120 is described later.

The electronic device 120 includes a housing 139 as illustrated in FIG. 2(B), and the storage battery 135, the coil 183, and the like are provided in a space surrounded by the housing 139. The housing 139 can be formed of a metal, for example. As the metal, aluminum, stainless steel, or the like can be used. Since metals might block electromagnetic waves, electric waves, or the like, at least part of the housing 139 is preferably formed using a material having a lower blocking property than metals, such as glass, quartz, plastics, or a flexible resin, for example. For example, a surface of the housing 139 which faces the power feeding device 140 can be formed using a material having a lower blocking property than metals.

The electronic device 120 is provided over the power feeding device 140 or in the vicinity of the power feeding device 140. The power feeding device 140 can charge the storage battery 135 included in the electronic device 120. Specifically, for example, the storage battery 135 can be charged by transmission of a wireless signal from the coil 185 included in the power feeding device 140 to the coil 183 included in the electronic device 120.

The power feeding device 140 may have a function of detecting the position of the coil 183. Furthermore, the power feeding device 140 may have a function of moving the coil 185 to a distance where a signal can be efficiently transmitted to the coil 183, in response to the detected positional information on the coil 183.

The power feeding device 140 may include a position detection circuit and a moving mechanism. Furthermore, the power feeding device 140 may include a position detection coil. For example, a plurality of position detection coils are provided in the power feeding device 140 to cause electromagnetic induction between the coil 183 and each of the plurality of position detection coils. A position detection coil with a larger electromagnetic induction force is positioned closer to the coil 183; by utilizing this, the position of the coil 183 can be detected. For example, as illustrated in FIG. 2(B), after the electronic device 120 is provided over the power feeding device 140, the position of the coil 183 can be detected and the coil 185 can be moved in a direction indicated by an arrow.

The coil 185 and the coil 183 can mutually transmit and receive a wireless signal. The coil 185 and the coil 183 can employ a method of electromagnetic induction, electric wave reception, resonance, or the like for transmission and reception. The coil 185 and the coil 183 are referred to as antennas, in some cases. Furthermore, the coil 185 and the coil 183 may perform transmission and reception in conformity with an international standard such as Qi.

Since wireless power feeding can be used in order to feed power to the electronic device 120, the electronic device 120 is not provided with a terminal for power feeding, in some cases. In the case where the electronic device 120 is provided with a terminal for power feeding, the housing 139 has an opening in the terminal portion, for example, and moisture or dust may break into the housing 139 of the electronic device 120 from the terminal portion. The entry of moisture or dust may cause a malfunction or a short circuit in various circuits such as a control circuit and a storage battery. The structure not provided with the terminal for power feeding may improve water resistance and dust resistance of the electronic device 120.

In the electronic device of one embodiment of the present invention, an OS transistor can be used in at least part of a memory, a neural network, a CPU, and other circuits. An OS transistor is not easily affected by a short-channel effect and can have a more favorable on/off ratio than a silicon transistor or the like, without the need for thinning a gate insulating film. Furthermore, an OS transistor has a high withstand voltage between its source and drain and thus can operate at a higher voltage with ensured reliability. This can lead to a stable circuit operation during long-distance wireless power feeding at a higher voltage in some cases. Moreover, in some cases, an OS transistor is less likely to be affected by noise than a silicon transistor, which allows more stable wireless power feeding. A memory including an OS transistor is described later.

The control circuit 186 and the control circuit 182 include a rectifier circuit, a demodulation circuit, a modulation circuit, a constant voltage circuit, or the like, for example. Furthermore, at least one of the control circuit 186 and the control circuit 182 may include a current or voltage detection circuit, a driver circuit, an analog-digital converter circuit, a digital-analog converter circuit, or the like, for example.

The control circuit 182 can supply power supplied from the power feeding device 140 through the coil 183 to circuits incorporated in the control circuit 182 and each block included in the electronic device 120, for example, the block 161. Each block included in the electronic device 120 can include a variety of components. The block 161 includes one or more components selected from a display portion, an imaging portion, a sensor element, a speaker, a microphone, and the like, for example. For example, in the case where the electronic device 120 has a display portion, the control circuit 182 can supply power to a driver circuit of the display portion. The control circuit 182 may include a power management IC.

The charge control circuit 171 has a function of charging a storage battery. Furthermore, the charge control circuit 171 has a function of measuring a parameter of a storage battery. The current of the storage battery 135 may be measured with the coulomb counter CC included in the charge control circuit 171.

The SOC (State of Charge) of the storage battery 135 is preferably estimated by the charge control circuit 171. The SOC is, for example, a value representing the percentage of the storage battery capacity when the full charge capacity (FCC) is 100%. The SOC is referred to as a remaining capacity value or a charging rate in some cases. The FCC is, for example, the discharge capacity of a storage battery in the case where discharging is performed after full charging is performed. Full charging refers to, for example, charging a storage battery to the end under a predetermined charge condition. The FCC is a value that varies depending on an end-of-charge voltage (an upper charging voltage limit), an end-of-charge current, or the like.

The SOC of the storage battery 135 may be estimated by the coulomb counter CC. The SOC of the storage battery 135 may be estimated using a single parameter or a plurality of parameters of the storage battery 135.

When the parameter of the storage battery 135 matches an end-of-charge condition, becomes higher than or equal to an end-of-charge voltage, or becomes lower than or equal to an end-of-charge current, the charge control circuit 171 can supply a signal telling an end of charge to the control circuit 182.

The control circuit 182 has a function of supplying a charge condition of the storage battery 135 to the charge control circuit 171. Furthermore, the control circuit 182 has a function of supplying a parameter of the storage battery 135 to the control circuit 186 through the coil 183 and the coil 185. Examples of the parameter of the storage battery 135 are a voltage, a current, an estimated SOC, an impedance, an open circuit voltage, an individual identification number, and the like of the storage battery 135. Furthermore, the electronic device 120 preferably includes a clock that outputs time information. In the case where the electronic device 120 includes a clock (a device having a function of measuring time), the time when the parameter is obtained linked with the parameter of the storage battery 135 may be supplied to the control circuit 186.

The control circuit 186 has a function of supplying the parameter of the storage battery 135 to the neural network NN. In accordance with the supplied parameter, the neural network NN outputs a numerical value V1. A numerical value V12 corresponding to the numerical value V1 output by the neural network NN is supplied to the control circuit 182 from the control circuit 186 through the coil 185 and the coil 183. Here, the numerical value V1 and the numerical value V12 are each not necessarily a single numerical value but may be data being a set of several numerical values.

The charge condition of the storage battery 135 is determined by the control circuit 186 on the basis of the supplied numerical value V12, and the determined charge condition is supplied to the charge control circuit 171.

In the structure illustrated in FIG. 1, the power feeding device 140 includes an antenna 189, and the electronic device 120 includes an antenna 188. The antenna 188 and the antenna 189 can give and receive data to/from a server 133. In the case where learning is performed in the server 133, a connection strength updated by the learning can be supplied from the server 133 to the neural network NN through the antenna 189. Alternatively, a connection strength updated by the learning can be supplied from the server 133 to a memory included in the control circuit 182 through the antenna 188, and then the connection strength can be supplied from the memory to the neural network NN through the coil 183 and the coil 185. By following the path backward, data for learning can be supplied from the neural network NN to the server.

The memory 132 preferably includes a volatile memory and a nonvolatile memory, for example. As the volatile memory, a DRAM, an SRAM, or the like can be used, for example. The memory 132 may function as an external memory of a CPU included in the control circuit 186.

A memory including an OS transistor described later can be used as the memory 132. The calculation scale of the operation using a neural network sometimes becomes enormous, and an enormous amount of data is transferred to the memory or read from the memory. The use of the memory including an OS transistor in an electronic device of one embodiment of the present invention can reduce power consumption. The reduction in power consumption suppresses generation of heat from the electronic device 120. In addition, the use of the memory including an OS transistor may increase the speed of writing, reading, and the like in some cases.

As the storage battery 135, a secondary battery is preferably used, for example. Examples of the secondary battery include a secondary battery that utilizes an electrochemical reaction, such as a lithium ion battery, an electrochemical capacitor such as an electric double-layer capacitor or a redox capacitor, an air battery, a fuel battery, and the like.

As a positive electrode material of the secondary battery, a material including an element A, an element X, and oxygen can be used, for example. The element A is preferably one or more selected from the Group 1 elements and the Group 2 elements. As a Group 1 element, an alkali metal such as lithium, sodium, or potassium can be used, for example. As a Group 2 element, calcium, beryllium, magnesium, or the like can be used, for example. As the element X, one or more selected from metal elements, silicon, and phosphorus can be used, for example. The element X is preferably one or more selected from cobalt, nickel, manganese, iron, and vanadium.

The coulomb counter CC has a function of calculating the amount of accumulated charge with the use of time characteristics of the current of the storage battery 135.

The protection circuit 137 has a function of stopping the operation of the storage battery when the storage battery 135 satisfies a certain predetermined condition. For example, the operation is stopped when the current of the storage battery 135 exceeds a certain value. For another example, the operation is stopped when the voltage of the storage battery becomes higher than or equal to a certain value or lower than or equal to a certain value. The protection circuit 137 can control the storage battery 135 with the use of the current and the voltage of the storage battery 135 that are measured by the charge control circuit 171 described later, for example. When stopping the operation of the storage battery 135, the protection circuit 137 may have a path to connect two electrodes (e.g., a positive electrode and a negative electrode) of the storage battery 135 to cause a short circuit between the two electrodes. A resistor or a capacitor may be provided in the path.

The sensor element 174 preferably includes one or more of a pressure sensor, a temperature sensor, an acceleration sensor, and a strain sensor.

As the sensor element 174, a sensor having a function of detecting whether a user is in the neighborhood by imaging or irradiation from a light source can be used. A detection result from the sensor element 174 can be supplied to the neural network.

The transistor 147 and the transistor 148 function as switches that block current, and the switches are operated when the protection circuit 137 decides to stop the storage battery 135. Although MOSFETs including parasitic diodes are illustrated as the transistor 147 and the transistor 148 in the example illustrated in FIG. 1, OS transistors may be used as the transistor 147 and the transistor 148. The details of an OS transistor are described later.

Figure 3:
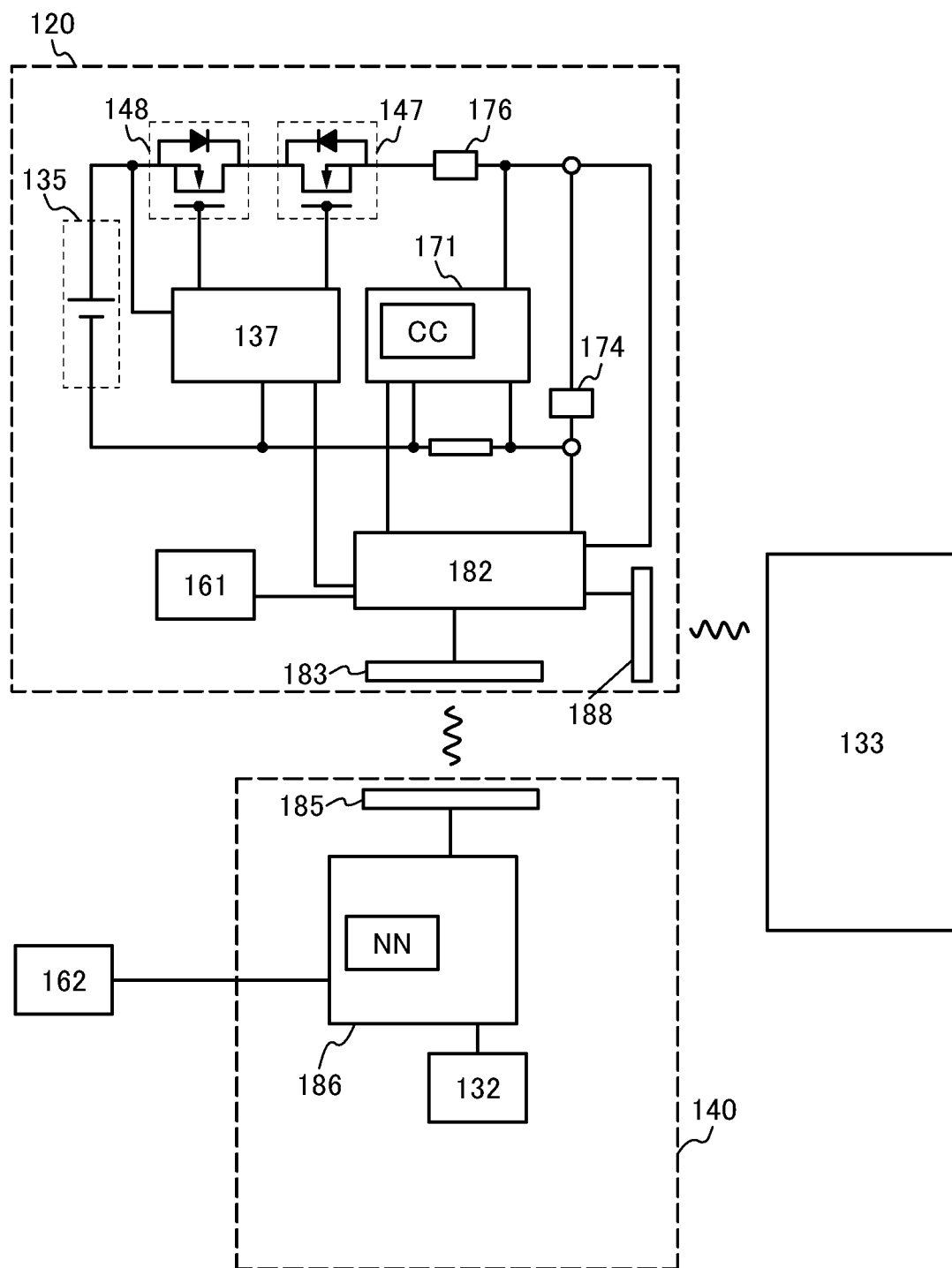
FIG. 3 A view illustrating an example of an electronic device, a power feeding device, and a block.

The structure illustrated in FIG. 3 is different from the structure illustrated in FIG. 1 in not including the antenna 189 in the power feeding device 140. In the case where learning is performed in the server 133, a connection strength updated by the learning is supplied from the server 133 to the memory included in the control circuit 182 through the antenna 188, and the connection strength can be supplied from the memory to the neural network NN through the coil 183 and the coil 185. By following the path backward, data for learning can be supplied from the neural network NN to the server.

Figure 4:
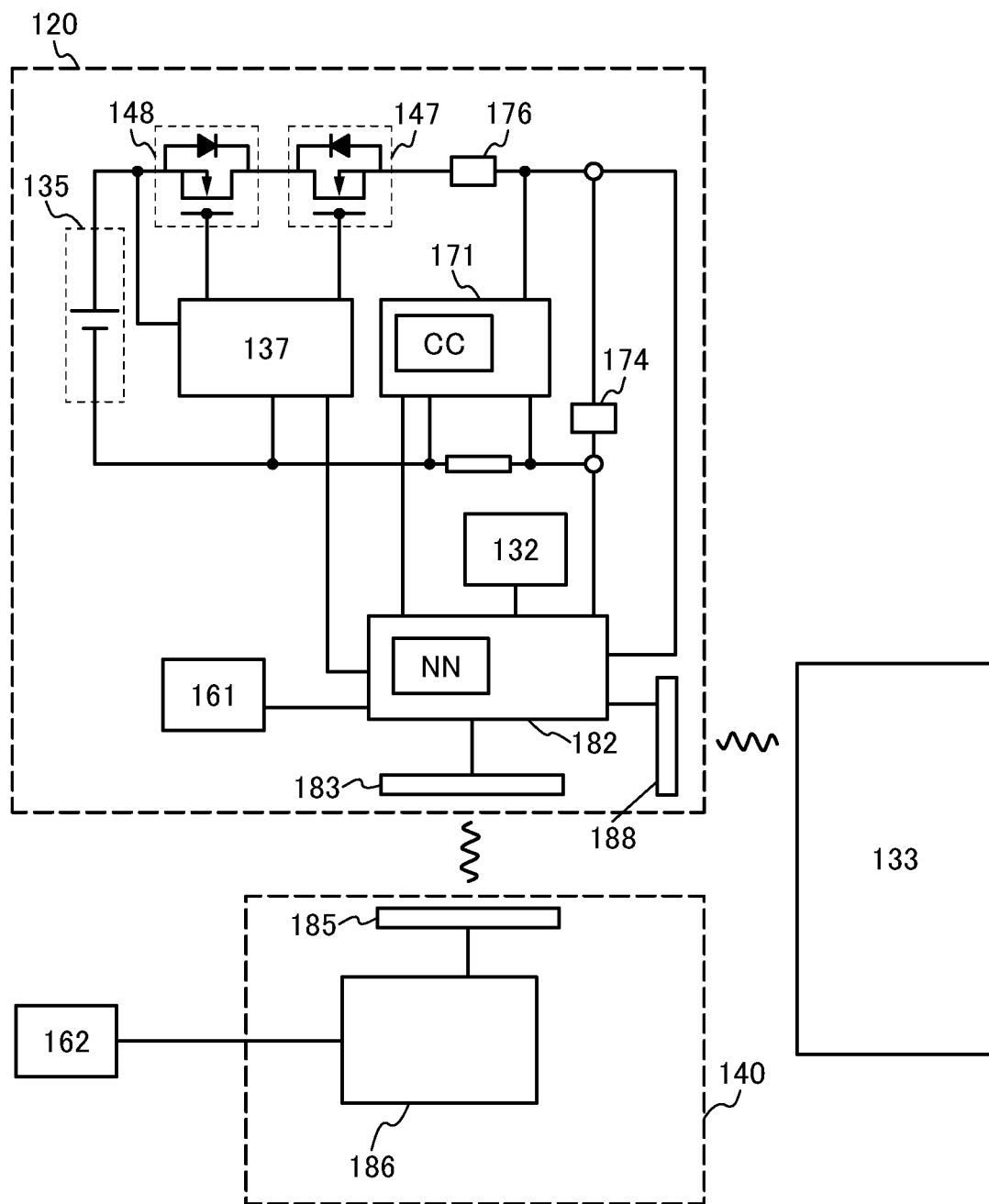
FIG. 4 A view illustrating an example of an electronic device, a power feeding device, and a block.

The structure illustrated in FIG. 4 is different from the structure illustrated in FIG. 1 in that the control circuit 182 includes a neural network NN, that the memory 132 is electrically connected to the control circuit 182, and that the power feeding device 140 does not include the neural network NN, the memory 132, and the antenna 189. In the case where learning is performed in the server 133, the control circuit 182 can supply the connection strength from the server 133 to the neural network NN through the antenna 188. By following the path backward, data for learning can be supplied from the neural network NN to the server. Note that the power feeding device 140 in FIG. 4 may include the neural network NN, the memory 132, and the antenna 189.

Operation Method of Power Feeding Device

An operation of the power feeding device of one embodiment of the present invention is described with reference to a flowchart illustrated in FIG. 5.

Processing starts in Step S200. Then, in Step S201, a user provides the electronic device 120 including the storage battery 135 for the power feeding device 140, specifically over the power feeding device 140 or in the neighborhood thereof. The neighborhood herein means a distance of shorter than 500 mm, a distance of shorter than 300 mm, or a distance of shorter than 100 mm for provision, for example.

Next, in Step S202, the coil 183 included in the electronic device 120 is detected. In the next Step S203, the coil 185 is moved. Note that the movement of the coil 185 need not be performed in some cases. Moving the coil 185 to the neighborhood of the coil 183 allows signal transmission and power feeding from the coil 185 to the coil 183 with high power efficiency.

Next, in Step S204, a parameter of the storage battery 135 is obtained. The parameter of the storage battery 135 is obtained with the charge control circuit 171 or the like. Next, in Step S205, the charge control circuit 171 estimates the SOC of the storage battery 135 on the basis of the obtained parameter. Note that the SOC of the storage battery 135 may be estimated with the neural network NN. Next, in Step S206, the estimated SOC is supplied to the neural network NN.

Next, in Step S207, inference by the neural network NN is performed. Then, in Step S208, the storage battery 135 is charged on the basis of an operation result obtained from the inference by the neural network NN. Specifically, for example, a numerical value corresponding to the output from the neural network NN is supplied to the control circuit 186, a charge condition is determined on the basis of the supplied numerical value, and charging of the storage battery 135 is performed under the determined condition.

Next, in Step S209, the user removes the electronic device 120 including the storage battery 135 from the power feeding device 140. Note that charging of the storage battery 135 is not completed in Step S209 in some cases. Lastly, the processing is finished in Step S299.

Operation Method 2 of Power Feeding Device

Next, an operation of the power feeding device of one embodiment of the present invention is described with reference to a flow illustrated in FIG. 6.

Processing starts in Step S300. Next, Step S301 to Step S303 are performed. Step S201, Step S202, and Step S203 may be referred to for Step S301, Step S302, and Step S303, respectively.

Next, in Step S304, an identification number of the storage battery 135 or an identification number of the electronic device 120 on which the storage battery 135 is mounted, and a parameter of the storage battery 135 are obtained. The identification number is obtained with a read circuit included in the control circuit 182, for example. The parameter is obtained by the charge control circuit 171, for example. Next, in Step S305, the obtained identification number is supplied to the control circuit 186, and a connection strength corresponding to the identification number is supplied from the memory 132 to the neural network NN. Then, in Step S306, the SOC of the storage battery 135 is estimated by the control circuit 182 or the like on the basis of the obtained parameter.

Next, in Step S307, the estimated SOC is stored in the memory. Here, the SOC is preferably stored in the memory in the state of being linked with the identification number. In addition, the time when the parameter is obtained is preferably linked with the SOC and the identification number when stored in the memory. The data stored here is used for an update of a connection strength to be described later.

Next, in Step S309, inference is performed with the neural network NN where the connection strength has been updated. Then, in Step S310, the storage battery 135 is charged on the basis of an operation result obtained from the inference by the neural network NN. Specifically, for example, a numerical value corresponding to the output from the neural network NN is supplied to the control circuit 186, a condition is determined on the basis of the supplied numerical value, and charging of the storage battery 135 is performed under the determined condition.

Next, in Step S311, the user removes the electronic device 120 from the power feeding device. Then, for example, after a lapse of a certain time, the processing returns to Step S301. In Step S301, the user provides the electronic device 120 for the power feeding device. After that, processing in Step S302 to Step S311 is performed, and after a lapse of a certain time, the processing returns to Step S301 again. In other words, Step S301 to Step S311 are repeatedly performed in the flowchart illustrated in FIG. 6. In this case, every time the processing of Step S307 is performed, the SOC and the time corresponding to the identification number are accumulated in the neural network NN. When the neural network NN make an inference with the accumulated values, the inference accuracy of the electronic device 120 can be increased.

Operation Method 3 of Power Feeding Device

Next, an operation of the power feeding device of one embodiment of the present invention is described with reference to a flowchart illustrated in FIG. 7. The flowchart illustrated in FIG. 7 shows an example of providing a plurality of storage batteries or a plurality of electronic devices including a storage battery for a power feeding device.

Figure 7:
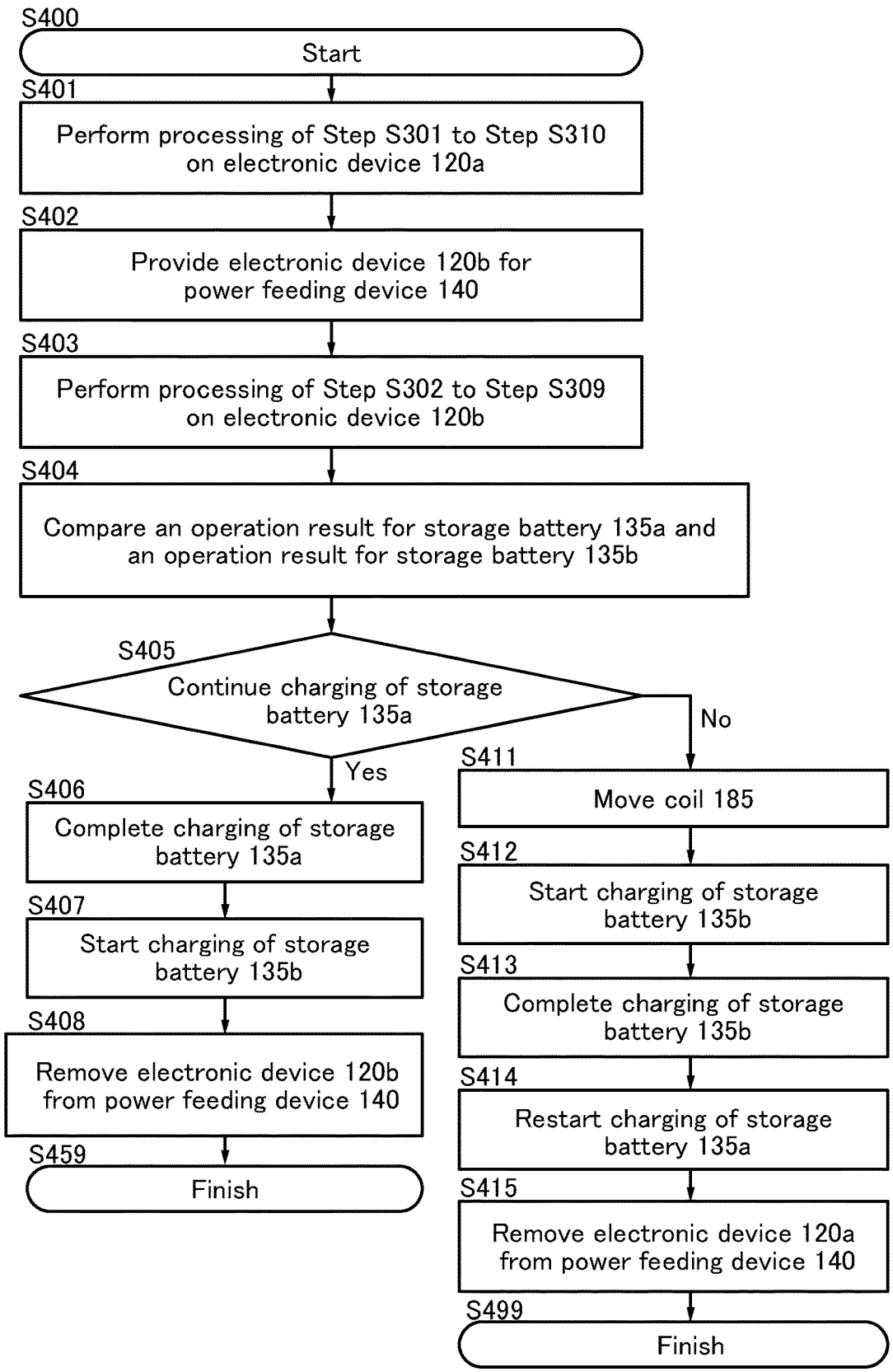
FIG. 7 A flow chart showing an operation of a power feeding device.

An example of providing two electronic devices 120 (an electronic device 120a and an electronic device 120b here) for the power feeding device 140 is considered in FIG. 7. A case where the electronic device 120a includes a storage battery 135a and a coil 183a and the electronic device 120b includes a storage battery 135b and a coil 183b is considered. Here, the description of the electronic device 120 can be referred to for the electronic device 120a and the electronic device 120b. Furthermore, the description of the storage battery 135 can be referred to for the storage battery 135a and the storage battery 135b. Furthermore, the description of the coil 183 can be referred to for the coil 183a and the coil 183b.

Processing starts in Step S400. Next, the processing of Step S301 to Step S310 shown in FIG. 6 is performed on the electronic device 120a in Step S401.

Figure 8A:
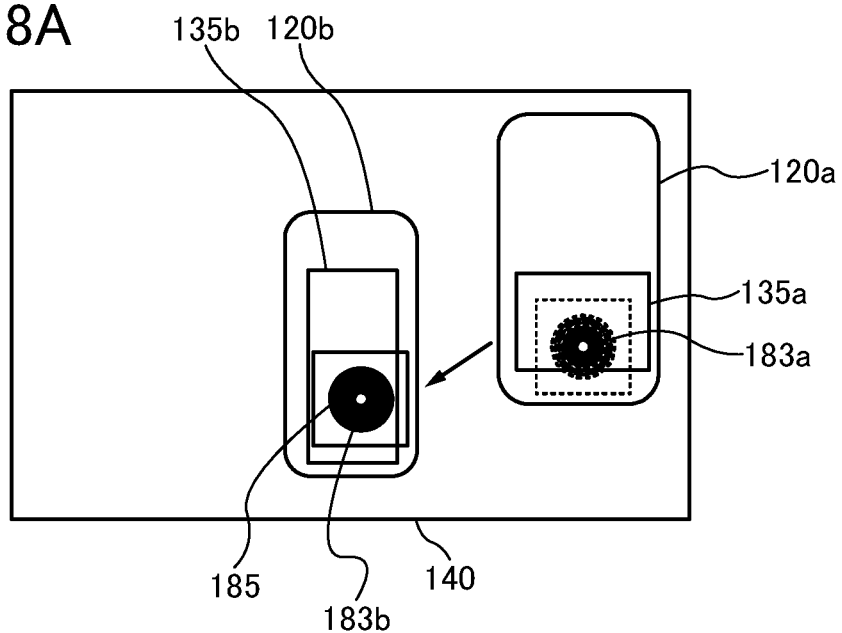
FIGS. 8A-8B A top view and a perspective view of an electronic device and a power feeding device.
Figure 8B:
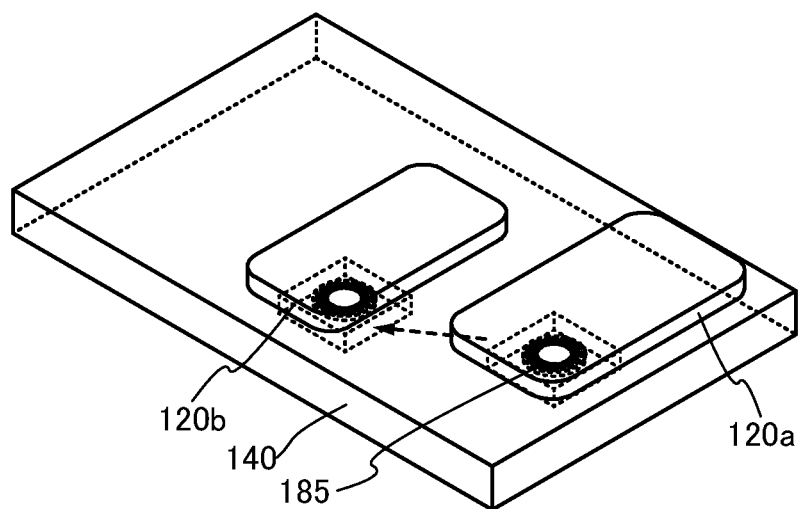

Next, in Step S402, the user provides the electronic device 120b for the power feeding device 140. An example of providing the power feeding device 140, the electronic device 120a, and the electronic device 120b in Step S402 is illustrated in a top view of FIG. 8(A) and a perspective view of FIG. 8(B). Then, the processing of Step S302 to Step S309 shown in FIG. 6 is performed in Step S403.

Next, in Step S404, an operation result of the neural network NN for the storage battery 135a and an operation result of the neural network NN for the storage battery 135b are compared. The comparison of the operation results is described later.

In Step S405, whether charging of the storage battery 135a is continued is decided on the basis of a comparison result in Step S404; thus, the processing step to be performed next is selected. In the case where charging of the storage battery 135a is continued (Yes), the processing goes to Step S406. In the case where charging of the storage battery 135a is not continued (No), that is, charging is stopped, the processing proceeds to Step S411.

In the case where the processing proceeds to Step S406, charging of the storage battery 135a is completed in Step S406, and then the processing proceeds to Step S407. In some cases, in Step S406, the user may remove the electronic device 120a from the power feeding device 140 before charging of the storage battery 135a is completed; the processing proceeds to Step S407 also in that case. Next, in Step S407, charging of the storage battery 135b starts under a charge condition corresponding to the operation result of the neural network NN. Then in Step S408, the electronic device 120b is removed from the power feeding device 140. Lastly, the processing is finished in Step S459.

In the case where the processing proceeds to Step S411, the coil 185 is moved to the neighborhood of the coil 183b in Step S411. Then in Step S412, the storage battery 135b is charged under a charge condition corresponding to the operation result of the neural network NN. Next, in Step S413, charging of the storage battery 135b is completed, and the processing proceeds to Step S414. Here, if the electronic device 120b is removed from the power feeding device 140 before Step S413, the processing proceeds to Step S414. Next, in Step S414, charging of the storage battery 135a, which has been stopped, is restarted. Next, in Step S415, the electronic device 120a is removed from the power feeding device 140. Lastly, the processing is finished in Step S499.

Update of Connection Strength

An example of updating a connection strength (weight) of a neural network is described.

First, a user of the electronic device 120 can link data such as the battery charge frequency, the charge start time, and the SOC at the time when charging is started with the time and accumulate the data in the power feeding device 140. The power feeding device 140 can extract a feature value with the use of the accumulated data. For the feature value extraction, a neural network may be used, or grouping based on numerical value ranges determined in advance may be performed, for example. The connection strength corresponding to the extracted feature value is selected from the server and supplied to the neural network NN. The power feeding device 140 determines a charge condition on the basis of a result obtained by calculation by the neural network NN with the supplied connection strength.

Figure 5:
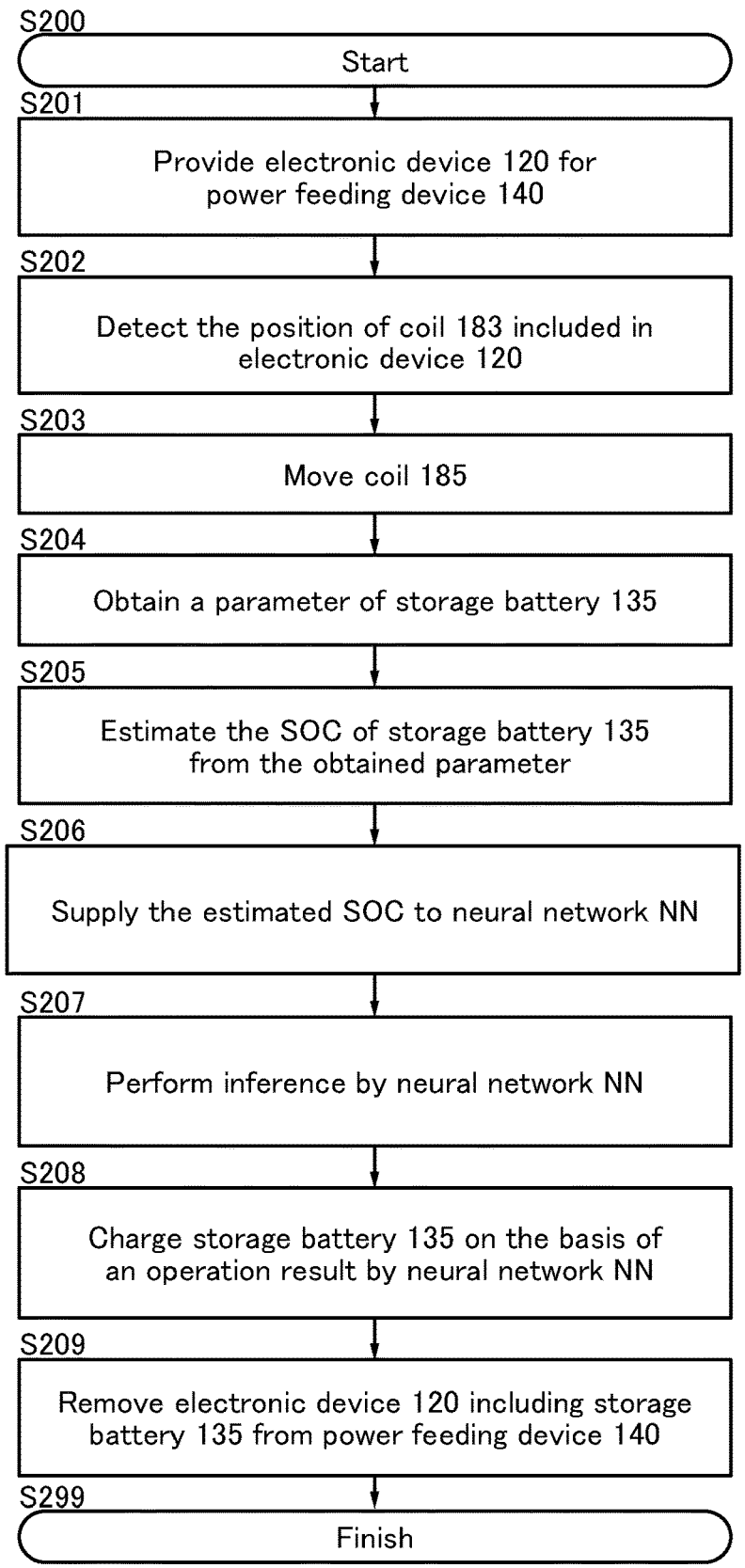
FIG. 5 A flow chart showing an operation of a power feeding device.
Figure 6:
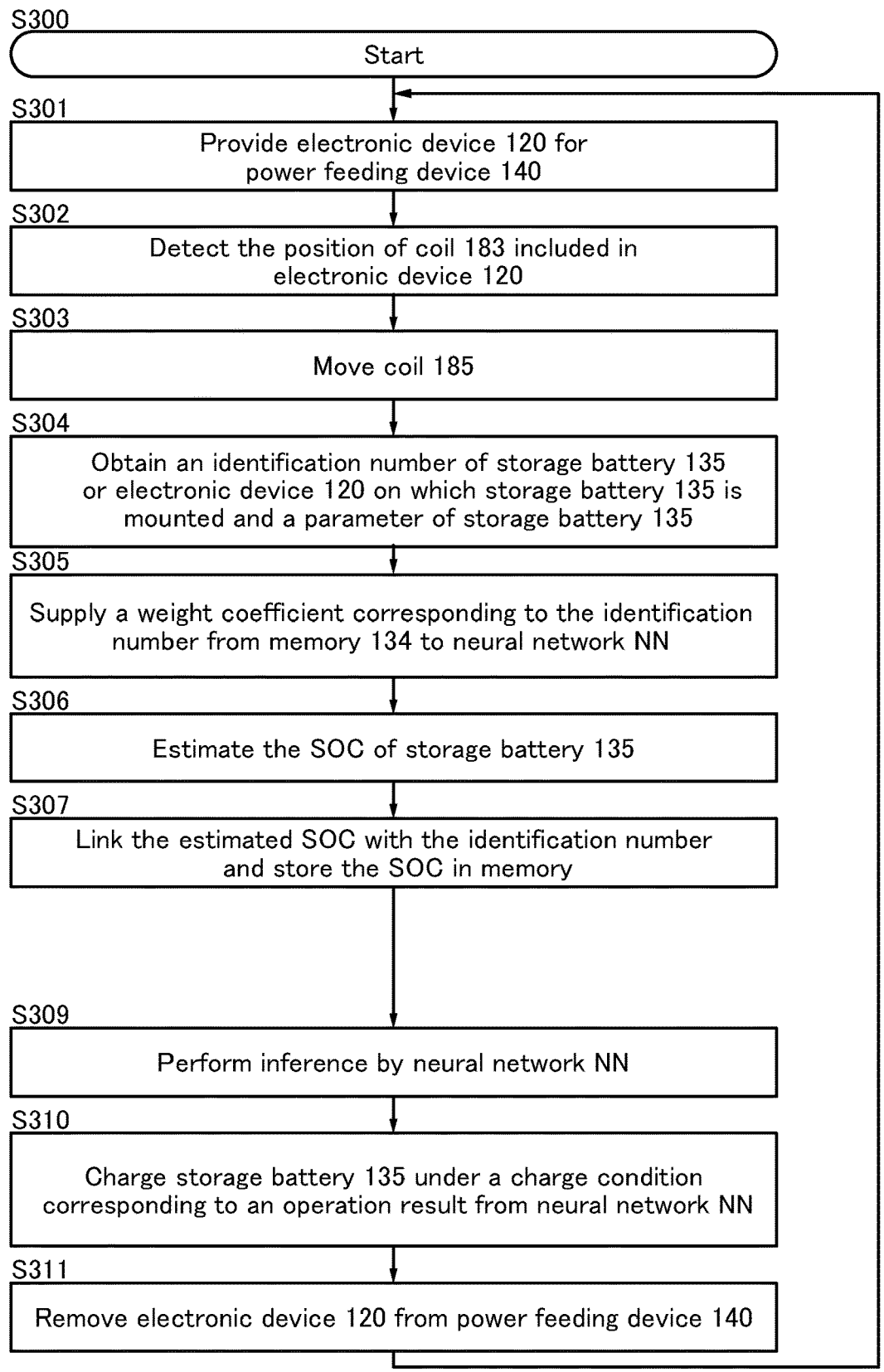
FIG. 6 A flow chart showing an operation of a power feeding device.

The update of the connection strength may be performed in Step S207 of FIG. 5, Step S305 or Step S307 of FIG. 6, or the like described previously. Alternatively, the connection strength may be updated when the steps described with FIG. 5 to FIG. 7 are not executed so as to be accumulated in the memory.

In the case of charging a plurality of storage batteries with the power feeding device 140, the obtained data is linked with the identification number of the corresponding storage battery and registered. In the case of charging a plurality of storage batteries, the priority of charging as well as a charge condition is determined by the neural network NN.

The power feeding device 140 can concurrently charge a plurality of storage batteries, in some cases. For example, two or more storage batteries can be charged concurrently, in some cases. In such a case, the coil 185 in the power feeding device 140 can be moved so that the distance between the coil 183 corresponding to the storage battery which is decided to have higher priority and the coil 185 included in the power feeding device 140 can be shorter than the distance between the coil 183 corresponding to another storage battery and the coil 185. In the case where a magnetic field, an electric field, or the like generated by the coil 185 has anisotropy, the coil 185 can be rotated, or rotated and moved so that the coil 183 corresponding to the storage battery which is decided to have higher priority can receive a higher magnetic field or electric field than the coil 183 corresponding to another storage battery.

When the SOC of the storage battery 135 keeps in a high state, e.g., a full charge stage for a long time, deterioration of the storage battery 135 is accelerated in some cases. The deterioration of the storage battery 135 means a reduction in full charge capacity over time, for example. Here, the usage tendency of the electronic device 120 can be judged from the charge frequency, the charge start time, the SOC at the time when charging is started, and the like, which are linked with the storage battery 135 included in the electronic device 120 and accumulated, with the neural network NN. For example, in the case where the SOC at the time when charging is started tends to be sufficiently high in the electronic device 120, that is, in the case where a state where the SOC at the time of charging is for example 30% or higher, or 40% or higher occurs frequently, the neural network NN recommends that an end-of-charge condition of the storage battery 135 is set to a capacity lower than the full charge capacity, e.g., a capacity that is higher than 70% and lower than 90% of the full charge; thus, deterioration of the storage battery can be slowed down. The recommended end-of-charge condition is preferably shown in a display portion, an indicator, or the like included in the power feeding device 140 or the electronic device 120, for example. As the indicator, a lamp or the like can be used. The user can confirm the recommended condition, and a signal showing whether to consent to the condition can be supplied from the display portion or an input portion (e.g., a button) of the power feeding device 140 or the electronic device 120, to the power feeding device 140.

Furthermore, suppressing a charge rate can suppress deterioration of the storage battery 135, in some cases. A low charge rate can be recommended for the electronic device 120 which tends to have a sufficiently high SOC at the time when charging is started or the electronic device 120 whose charge frequency is low.

Next, the order in the case of charging a plurality of storage batteries is described. A case where the storage battery 135 having a lower SOC is charged first in the case of charging a plurality of storage batteries in order is considered. In other words, charging is performed in order from the storage battery 135 which needs a larger charge amount. Charging in this order can narrow down the difference of charge completion time between the storage batteries.

The power feeding device of one embodiment of the present invention can narrow down the difference of charge completion time between a plurality of charged storage batteries.

In contrast, in the case where a user prefers that charging the electronic device 120 including the storage battery 135 with a higher SOC be completed in the shortest possible time, the user can supply a signal showing that the user does not consent to the condition recommended by the neural network NN to the power feeding device 140 with the display portion or the input portion (e.g., the button) of the power feeding device 140 or the electronic device 120.

With the use of the signal supplied from the display portion or the input portion, the neural network NN extracts a feature value, and the connection strength corresponding to the extracted feature value is selected from the server and supplied to the neural network NN. Updating the connection strength of the neural network NN in this manner, a charge condition that meets the user's preference or priority can be proposed, and furthermore deterioration of the storage battery can be suppressed.

Figure 9A:
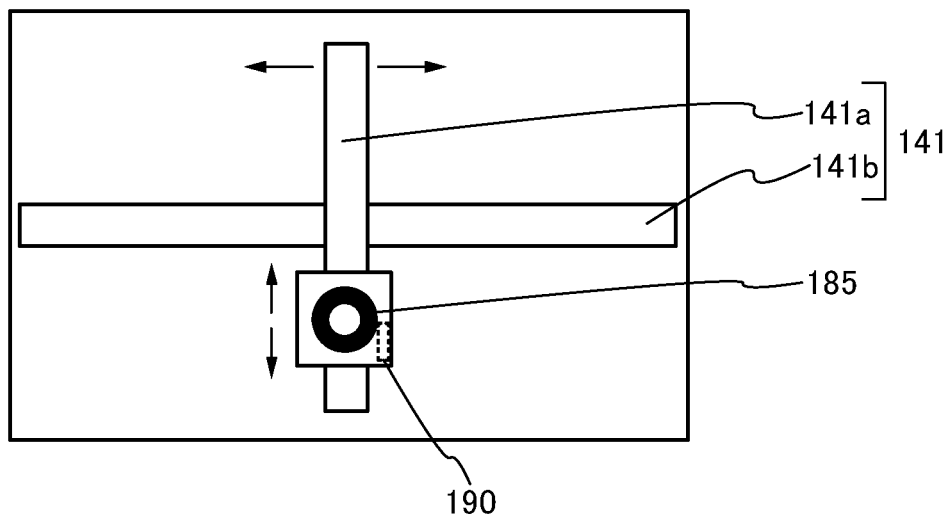
FIGS. 9A-9C A top view and a perspective view of a power feeding device.
Figure 9B:
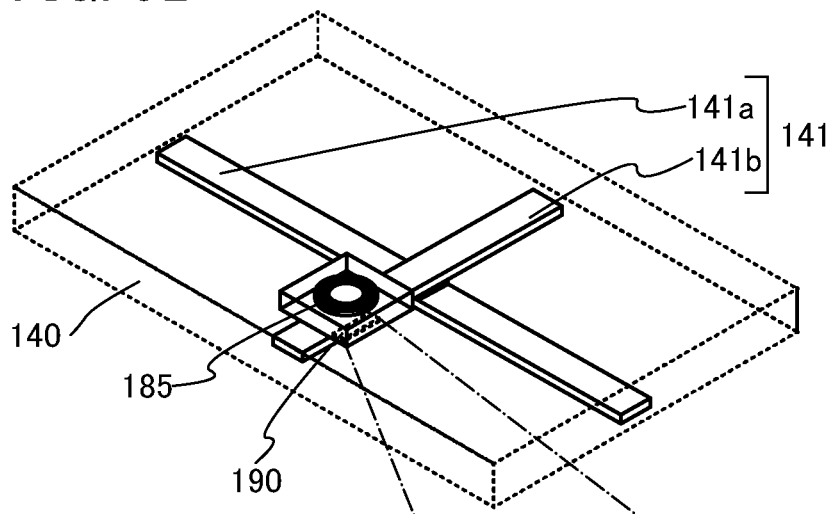

FIG. 9 illustrates an example in which the power feeding device 140 includes a motor 141 and the coil 185 is provided over the motor 141. FIG. 9(A) is a top view of the power feeding device 140, and FIG. 9(B) is a perspective view of the power feeding device 140. The motor 141 is a dual axis motor and includes a motor 141*a* corresponding to the first axis and a motor 141*b* corresponding to the second axis. The motor 141*a* moves in a lateral direction shown in FIG. 9(A), and the coil 185 over the motor 141*a* moves in a vertical direction shown in FIG. 9(A). As the motor 141, a rotating motor, a linear motor utilizing levitation by magnetic force, or the like can be used, for example. Instead of being provided over the motor, the coil 185 may be provided over a dual axis robotic arm.

The power feeding device 140 illustrated in FIG. 9 includes a chip group 190. The chip group 190 is a set of chips forming the control circuit 186 or the memory 132.

Figure 9C:
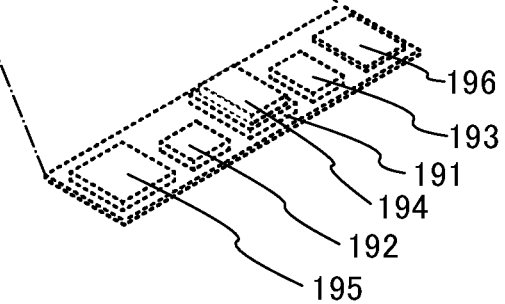

FIG. 9(C) is an enlarged view of the chip group 190. The chip group 190 includes an IC 191, an IC 192, an IC 193, and the like forming the control circuit 186; a memory 194, a memory 195, and the like forming the memory 132; and an antenna 196, for example.

For example, an IC including a CPU, a GPU, a neural network, or the like can be used as the IC 191. Furthermore, an IC having a function of controlling wireless power feeding through the coil 185 can be used as the IC 192, and the IC 192 includes a rectifier circuit, a demodulation circuit, a modulation circuit, a constant voltage circuit, or the like, for example. As the IC 193, a communication module described later can be used. The IC 193 has a function of performing communication via the antenna 196. The IC 193 can perform communication across a distance of 5 meters or more, 50 meters or more, or 500 meters or more, for example.

For example, a DOSRAM described later and a NOSRAM described later can be used as the memory 194 and the memory 195, respectively. Furthermore, a NOSRAM described later may be used as a memory included in the CPU, the GPU, or the like.

Figure 10A:
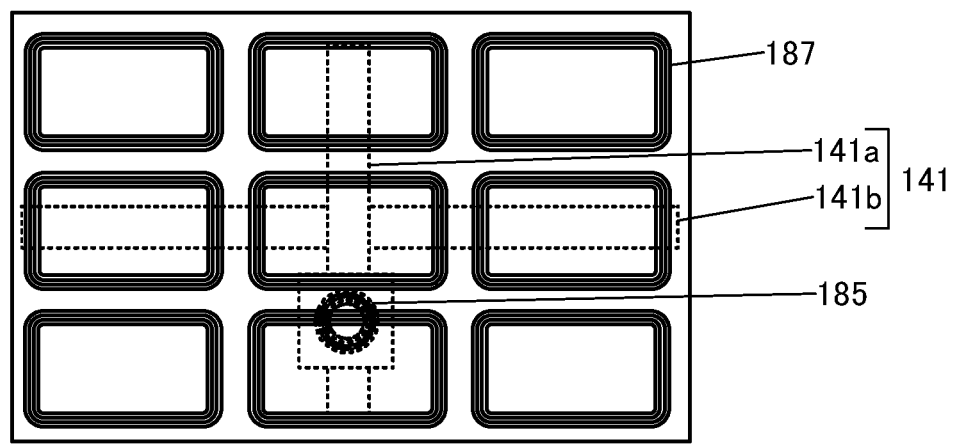
FIGS. 10A-10B Top views of power feeding devices.
Figure 10B:
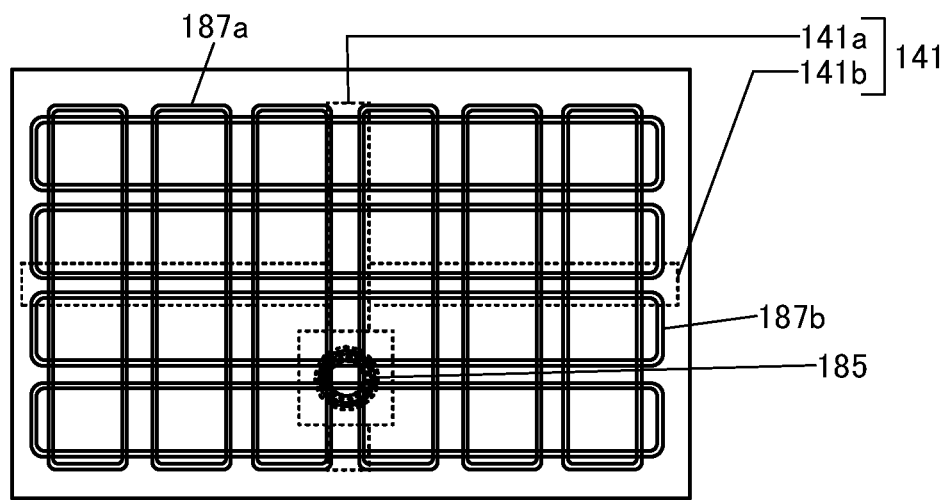

FIG. 10 illustrates an example in which the power feeding device 140 includes a plurality of position detection coils 187. Each of the plurality of position detection coils 187 is electrically connected to a position detection circuit. The position detection circuit has a function of measuring a current flowing through each coil. The power feeding device 140 illustrated in FIG. 10(A) includes nine position detection coils 187 which are provided in three columns and three rows. Furthermore, in the power feeding device 140 illustrated in FIG. 10(B), vertically oriented position detection coils 187*a* are provided in six columns and horizontally oriented position detection coils 187*b* are arranged in four rows.

This embodiment can be combined with the description of the other embodiments as appropriate.

Embodiment 2

In this embodiment, an example of the electronic device 120 described in the above embodiment is described.

Figure 11A:
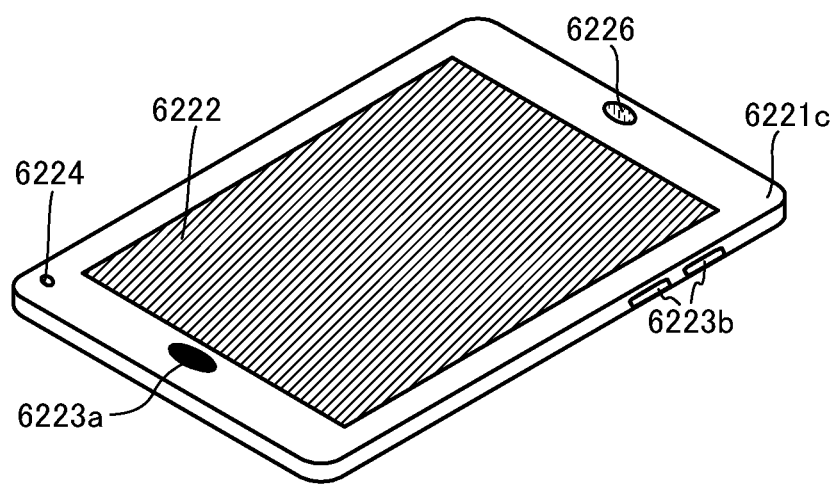
FIGS. 11A-11B Perspective views of an electronic device.
Figure 11B:
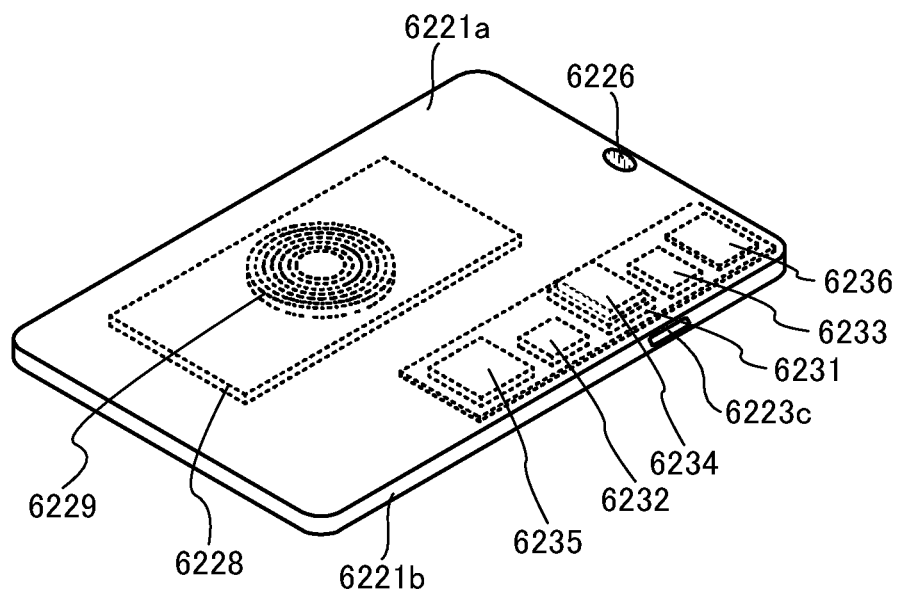

FIG. 11 illustrates a tablet information terminal 6200 as an example of an electronic device of one embodiment of the present invention. The information terminal 6200 includes a housing 6221*a*, a housing 6221*b*, a housing 6221*c*, a display portion 6222, an operation button 6223*a*, an operation button 6223*b*, a speaker 6224, a camera 6226, and a touch sensor. FIG. 11(A) is a perspective view of the information terminal 6200 seen from a surface having the display portion 6222, and FIG. 11(B) is a perspective view seen from a rear surface of the surface illustrated in FIG. 11(A).

The information terminal 6200 includes a storage battery 6228, a coil 6229, an IC 6231, an IC 6232, an IC 6233, a memory 6234, a memory 6235, an antenna 6236, and the like inside the housing composed of the housing 6221*a*, the housing 6221*b*, and the housing 6221*c*. For the storage battery 6228, the description of the storage battery 135 can be referred to. For the coil 6229, the description of the coil 183 can be referred to. For the antenna 6236, the antenna 188 can be referred to.

For example, the IC 6231 to the IC 6233 are ICs included in the control circuit 182 described in the above embodiment. As the IC 6231, an IC including a CPU, a GPU, a neural network, or the like can be used, for example. Furthermore, as the IC 6232, an IC having a function of wirelessly feeding power via the coil 6229 can be used. The IC 6232 includes a rectifier circuit, a demodulation circuit, a modulation circuit, a constant voltage circuit, or the like, for example. Furthermore, as the IC 6233, a communication module described later can be used. The IC 6233 has a function of performing communication via the antenna 6236. The IC 6233 can perform communication across a distance of 5 meters or more, 50 meters or more, or 500 meters or more, for example.

For the memory 6234 and the memory 6235, the description of the memory 132 described in the embodiment can be referred to. For example, a DOSRAM described later and a NOSRAM described later can be used as the memory 6234 and the memory 6235, respectively. Furthermore, a NOSRAM described later may be used as a memory included in the CPU, the GPU, or the like.

The communication module can perform communication via an antenna. For example, the communication module controls a control signal for connecting an electronic device to a computer network in response to instructions from an arithmetic portion such as a CPU and transmits the signal to the computer network. Accordingly, communication can be performed by connection of the electronic device to a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network). In the case where a plurality of communication methods are used, a plurality of antennas for the communication methods may be included.

The communication module is provided with a high frequency circuit (RF circuit), for example, to transmit and receive an RF signal. The high frequency circuit is a circuit for performing mutual conversion between an electromagnetic signal and an electric signal in a frequency band that is set by national laws to perform wireless communication with another communication apparatus using the electromagnetic signal. As a practical frequency band, several tens of kilohertz to several tens of gigahertz are generally used. A structure can be employed in which the high frequency circuit connected to an antenna includes a high frequency circuit portion compatible with a plurality of frequency bands and the high frequency circuit portion includes an amplifier, a mixer, a filter, a DSP, an RF transceiver, or the like. In the case of performing wireless communication, it is possible to use, as a communication protocol or a communication technology, a communication standard such as LTE (Long Term Evolution), GSM (Global System for Mobile Communication: registered trademark), EDGE (Enhanced Data Rates for GSM Evolution), CDMA 2000 (Code Division Multiple Access 2000), or WCDMA (Wideband Code Division Multiple Access: registered trademark), or a communication standard developed by IEEE such as Wi-Fi (registered trademark), Bluetooth (registered trademark), or ZigBee (registered trademark).

The communication module may have a function of connecting the electronic device to a telephone line. In the case of making a phone call through a telephone line, the communication module controls a connection signal for connecting the electronic device to the telephone line in response to an instruction from the arithmetic portion such as a CPU and transmits the signal to the telephone line.

To transfer or receive data at higher speed, the communication module sometimes needs more power. Even in such a case, the electronic device of one embodiment of the present invention can reduce power consumption by using an OS transistor in a neural network, a memory, or the like included in the control circuit. Since the power consumption of the whole electronic device can be suppressed, in some cases, the duration of the storage battery can be long even when high-speed data transfer or reception is performed.

The housing 6221*a*, the housing 6221*b*, and the housing 6221*c* may be formed of different materials. Alternatively, they may include the same material. Furthermore, two or more of the housing 6221*a*, the housing 6221*b*, and the housing 6221*c* may have a continuous structure.

As the housing 6221*a*, the housing 6221*b*, and the housing 6221*c*, a metal can be used, for example. As the metal, aluminum, stainless steel, or the like can be used. Moreover, since metals might block electromagnetic waves, electric waves, or the like, at least one of the housing 6221*a*, the housing 6221*b*, and the housing 6221*c* is preferably formed using a material having a lower blocking property than metals, such as glass, quartz, plastics, or a flexible resin, for example. For example, the housing 6221*a* is preferably formed using a material having a lower blocking property than metals. Furthermore, the housing 6221*c* positioned over the display portion 6222 can be formed using a material having a high transmittance, such as glass, quartz, plastics, or a resin, for example.

As illustrated in FIG. 11(A), the information terminal 6200 preferably has a structure including the camera 6226. Furthermore, although not illustrated, the information terminal 6200 may be provided with an infrared irradiation device. Moreover, although not illustrated, the information terminal 6200 may have a structure including a sensor for detecting a line of sight. The sensor for detecting a line of sight captures an image of an eye and the periphery thereof with an imaging device included in the electronic device 120 and detects data of the iris, the pupil, the outline of the eye, or the like from the captured image with a detection device, for example. With the structure held by the sensor for detecting a line of sight, biometric identification may be performed. The camera 6226 included in the information terminal 6200 has a lens used for imaging on its rear surface, for example. As shown by the example in FIG. 11(A) and FIG. 11(B), the information terminal 6200 includes an operation button 6223*c* positioned on a side surface that is opposite to the side surface where the operation button 6223*b* is provided.

Furthermore, the information terminal 6200 illustrated in FIG. 11(A) may have a structure including a device that obtains biological data of fingerprints, veins, iris, pupil, voice prints, or the like. Employing this structure allows the information terminal 6200 to have a biometric identification function.

The information terminal 6200 illustrated in FIG. 11(A) may have a structure including a light-emitting device for use as a flashlight or a lighting device.

In FIG. 11(A), the operation button 6223*a*, the speaker 6224, and the camera 6226 are provided so as to be embedded in a bezel of the housing 6221*c*.

Furthermore, the information terminal 6200 may include an optical sensor. The optical sensor can measure the illuminance of external light. In addition, the optical sensor may measure the incident angle of external light.

A function of a position input device may be added to the information terminal 6200 of one embodiment of the present invention. The function of the position input device can be added by provision of a touch panel in a display portion. Alternatively, the function of the position input device can be added by provision of a photoelectric conversion element called a photosensor in a pixel portion of a display device. As the operation button 6223*a* and the operation button 6223*b*, any of a power switch for starting the information terminal 6200, a button for operating an application of the information terminal 6200, a volume control button, a switch for turning on or off the display portion 6222, and the like can be provided. Although an example in which the number of operation buttons in the information terminal 6200 is four (the number of 6223*a*: 1, the number of 6223*b*: 2, the number of 6223*c*: 1, a total of 4) is illustrated in FIG. 11(A) and FIG. 11(B), the number and position of operation buttons in the information terminal 6200 are not limited to this.

Although not illustrated, the information terminal 6200 illustrated in FIG. 11(A) may have a structure provided with a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, infrared rays, or the like) inside the housing composed of the housing 6221*a*, the housing 6221*b*, and the housing 6221*c*. In particular, when a measuring device including a sensor such as a gyroscope sensor or an acceleration sensor for measuring inclination is provided, display on the screen of the display portion 6222 can be automatically changed in accordance with the orientation of the information terminal 6200 by determining the orientation of the information terminal 6200 (the orientation of the information terminal with respect to the vertical direction).

Furthermore, although not illustrated, the information terminal 6200 illustrated in FIG. 11(A) may have a structure including a microphone. When the information terminal 6200 has a structure including a microphone and the speaker 6224, a telephone call function as in a mobile phone can be offered to the information terminal 6200, for example. In some cases, the information terminal 6200 can have a speech interpretation function. With the speech interpretation function, the information terminal 6200 can have a function of operating the information terminal 6200 by speech recognition, a function of interpreting a speech or a conversation and creating a summary of the speech or the conversation, and the like. This can be utilized to create meeting minutes or the like, for example.

This embodiment can be implemented in combination with the other embodiments as appropriate.

Embodiment 3

In this embodiment, a structure example of a semiconductor device that can be used in the neural network described in the above embodiment is described.

Figure 12A:
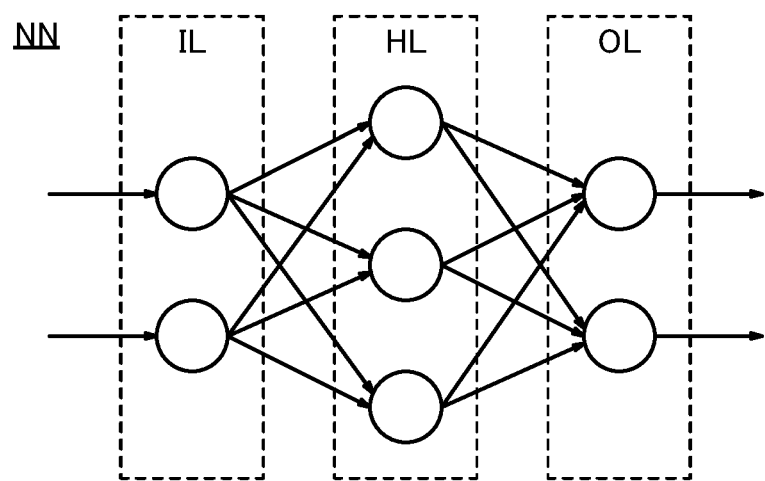
FIGS. 12A-12B Views illustrating a structure example of a neural network.

As shown in FIG. 12(A), the neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as a DNN (deep neural network), and learning using a deep neural network can also be referred to as deep learning.

Input data is input to neurons of the input layer IL, output signals of neurons in the previous layer or the subsequent layer are input to neurons of the middle layer HL, and output signals of neurons in the previous layer are input to neurons of the output layer OL. Note that each neuron may be connected to all the neurons in the previous and subsequent layers (full connection), or may be connected to some of the neurons.

Figure 12B:
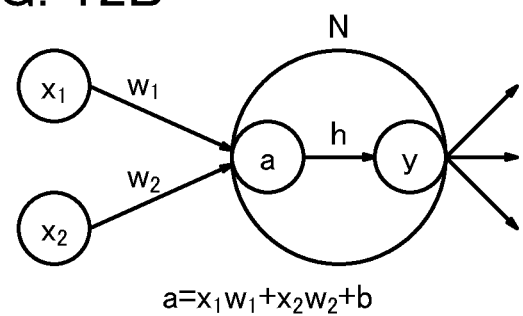

FIG. 12(B) shows an example of an operation with the neurons. Here, a neuron N and two neurons in the previous layer that output signals to the neuron N are shown. An output $x_1$ of the neuron in the previous layer and an output $x_2$ of the neuron in the previous layer are input to the neuron N. Then, in the neuron N, a total sum $x_1w_1+x_2w_2$ of the product of the output $x_1$ and a weight $w_1$ ($x_1w_1$) and the product of the output $x_2$ and a weight $w_2$ ($x_2w_2$) is calculated, and then a bias b is added as necessary, so that a value $a=x_1w_1+x_2w_2+b$ is obtained. Then, the value a is converted with an activation function h, and an output signal $y=h(a)$ is output from the neuron N.

In this manner, the operation with the neurons includes the operation that sums the products of the outputs and the weights of the neurons in the previous layer, that is, the product-sum operation ($x_1w_1+x_2w_2$ described above). This product-sum operation may be performed using a program on software or using hardware. In the case where the product-sum operation is performed using hardware, a product-sum operation circuit can be used. Either a digital circuit or an analog circuit may be used as this product-sum operation circuit. When an analog circuit is used as the product-sum operation circuit, the circuit scale of the product-sum operation circuit can be reduced, or higher processing speed and lower power consumption can be achieved owing to reduced frequency of access to a memory.

The product-sum operation circuit may be formed using a transistor including silicon (such as single crystal silicon) in a channel formation region (hereinafter, also referred to as a Si transistor) or may be formed using a transistor including an oxide semiconductor in a channel formation region (hereinafter, also referred to as an OS transistor). An OS transistor is particularly suitable as a transistor included in a memory of the product-sum operation circuit because of its extremely low off-state current. Note that the product-sum operation circuit may be formed using both a Si transistor and an OS transistor. A structure example of a semiconductor device having a function of the product-sum operation circuit is described below.

Structure Example of Semiconductor Device

Figure 13:
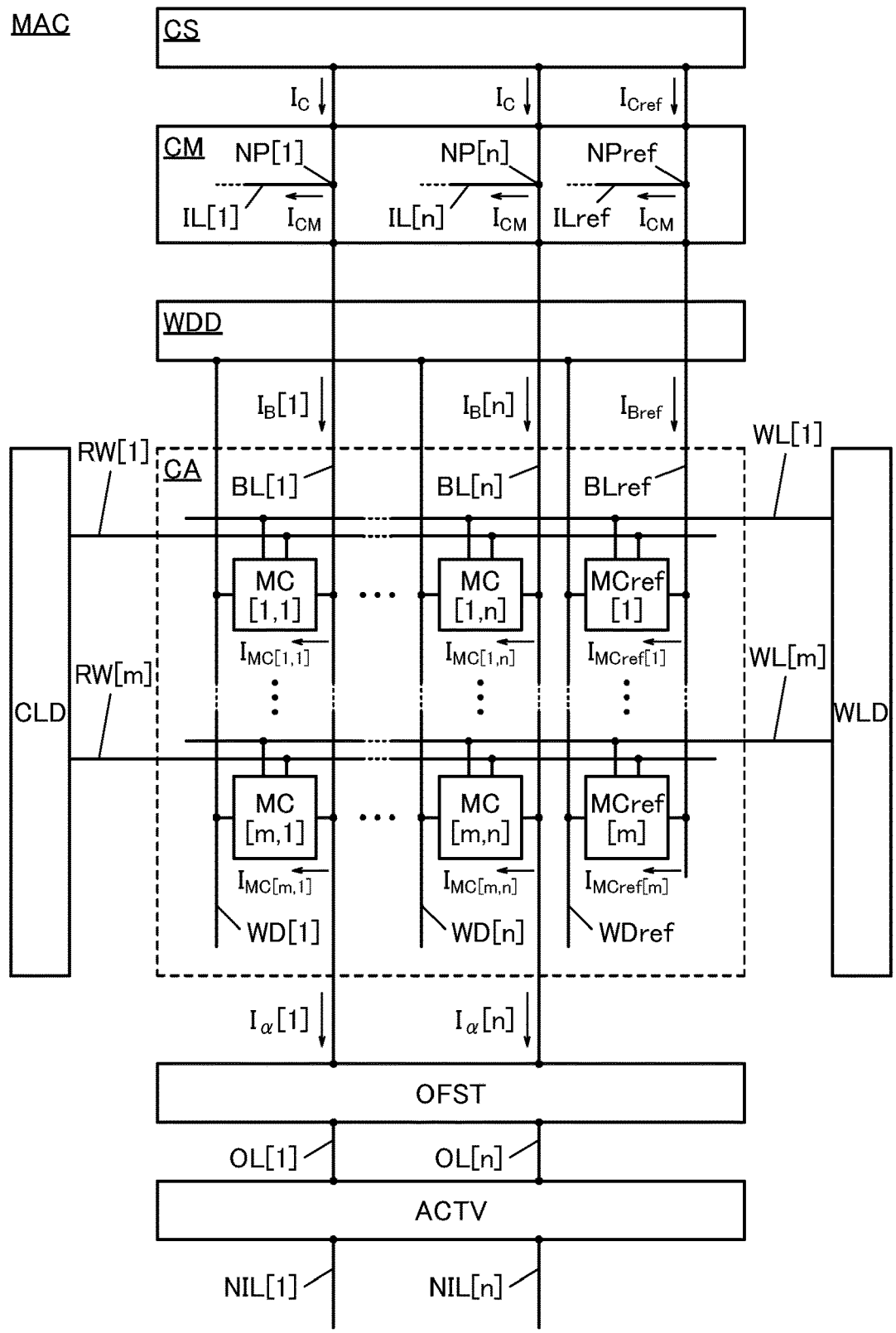
FIG. 13 A view illustrating a structure example of a semiconductor device.

FIG. 13 shows a structure example of a semiconductor device MAC having a function of performing an operation of a neural network. The semiconductor device MAC has a function of performing a product-sum operation of first data corresponding to the connection strength between the neurons (weight) and second data corresponding to input data. Note that the first data and the second data can each be analog data or multilevel digital data (discrete data). The semiconductor device MAC also has a function of converting data obtained by the product-sum operation with an activation function.

The semiconductor device MAC includes a cell array CA, a current source circuit CS, a current mirror circuit CM, a circuit WDD, a circuit WLD, a circuit CLD, an offset circuit OFST, and an activation function circuit ACTV.

The cell array CA includes a plurality of memory cells MC and a plurality of memory cells MCref. In the structure example shown in FIG. 13, the cell array CA includes the memory cells MC (MC[1, 1] to MC[m, n]) in m rows and n columns (m and n are integers greater than or equal to 1) and the m memory cells MCref (MCref[1] to MCref[m]). The memory cells MC have a function of storing the first data. In addition, the memory cells MCref have a function of storing reference data used for the product-sum operation. Note that the reference data can be analog data or multilevel digital data.

The memory cell MC[i, j] (i is an integer greater than or equal to 1 and less than or equal to m, and j is an integer greater than or equal to 1 and less than or equal to n) is connected to a wiring WL[i], a wiring RW[i], a wiring WD[j], and a wiring BL[j]. In addition, the memory cell MCref[i] is connected to the wiring WL[i], the wiring RW[i], a wiring WDref, and a wiring BLref. Here, a current flowing between the memory cell MC[i, j] and the wiring BL[j] is denoted by $I_{MC[i, j]}$, and a current flowing between the memory cell MCref[i] and the wiring BLref is denoted by $I_{MCref[i]}$.

Figure 14:
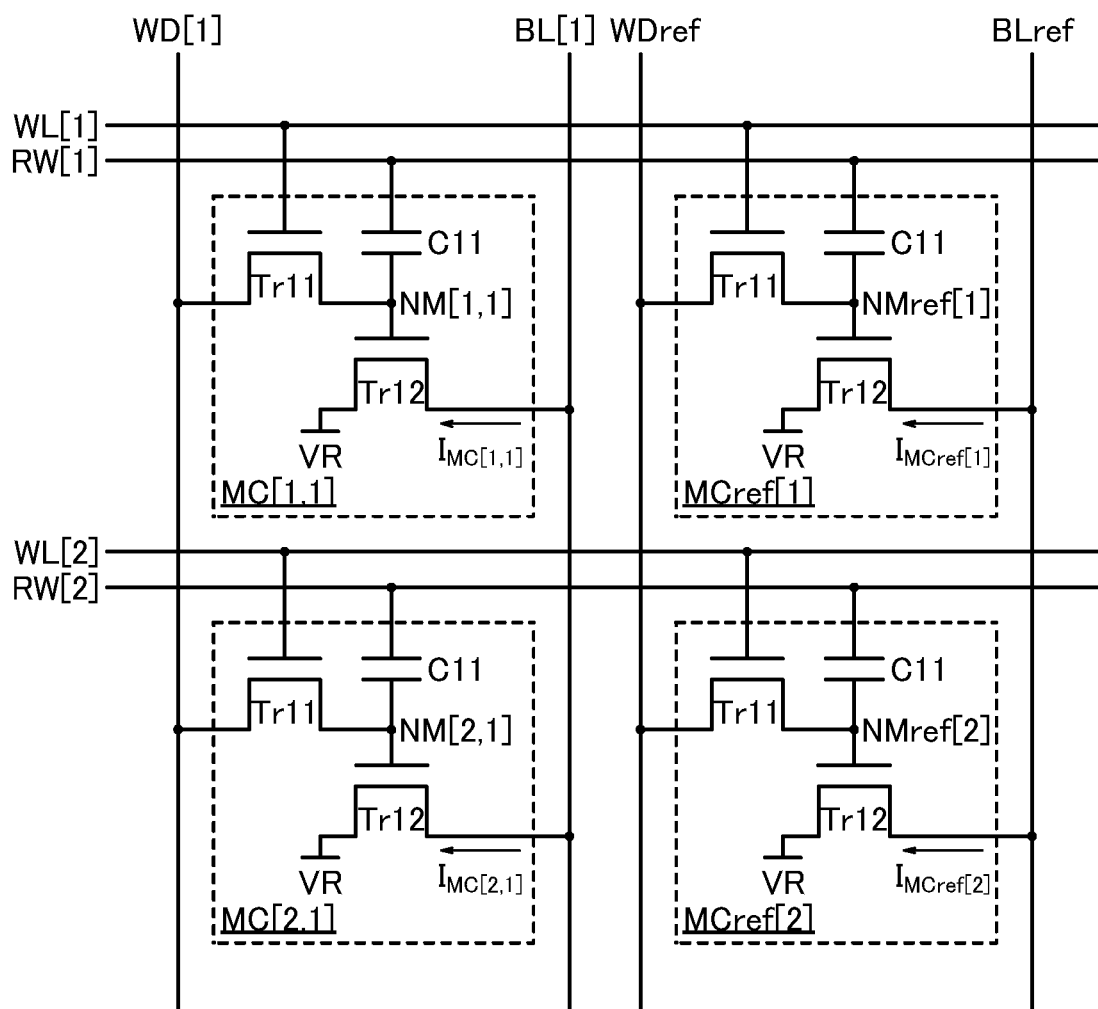
FIG. 14 A view illustrating a structure example of a memory cell.

FIG. 14 shows a specific structure example of the memory cells MC and the memory cells MCref. Although the memory cells MC[1, 1] and MC[2, 1] and the memory cells MCref[1] and MCref[2] are shown as typical examples in FIG. 14, similar structures can be used for other memory cells MC and memory cells MCref. The memory cells MC and the memory cells MCref each include transistors Tr11 and Tr12 and a capacitor C11. Here, the case where the transistor Tr11 and the transistor Tr12 are n-channel transistors is described.

In the memory cell MC, a gate of the transistor Tr11 is connected to the wiring WL, one of a source and a drain is connected to a gate of the transistor Tr12 and a first electrode of the capacitor C11, and the other of the source and the drain is connected to the wiring WD. One of a source and a drain of the transistor Tr12 is connected to the wiring BL, and the other of the source and the drain is connected to a wiring VR. A second electrode of the capacitor C11 is connected to the wiring RW. The wiring VR is a wiring having a function of supplying a predetermined potential. Here, the case where a low power supply potential (e.g., a ground potential) is supplied from the wiring VR is described as an example.

A node connected to the one of the source and the drain of the transistor Tr11, the gate of the transistor Tr12, and the first electrode of the capacitor C11 is referred to as a node NM. The nodes NM in the memory cells MC[1, 1] and MC[2, 1] are referred to as nodes NM[1, 1] and NM[2, 1], respectively.

The memory cells MCref have a structure similar to that of the memory cell MC. However, the memory cells MCref are connected to the wiring WDref instead of the wiring WD and connected to the wiring BLref instead of the wiring BL. Nodes in the memory cells MCref[1] and MCref[2] each of which is connected to the one of the source and the drain of the transistor Tr11, the gate of the transistor Tr12, and the first electrode of the capacitor C11 are referred to as nodes NMref[1] and NMref[2], respectively.

The node NM and the node NMref function as retention nodes of the memory cell MC and the memory cell MCref, respectively. The first data is retained in the node NM and the reference data is retained in the node NMref. Currents $I_{MC[1,1]}$ and $I_{MC[2,1]}$ from the wiring BL[1] flow to the transistors Tr12 of the memory cells MC[1, 1] and MC[2, 1], respectively. Currents $I_{MCref[1]}$ and $I_{MCref[2]}$ from the wiring BLref flow to the transistors Tr12 of the memory cells MCref[1] and MCref[2], respectively.

Since the transistor Tr11 has a function of retaining a potential of the node NM or the node NMref, the off-state current of the transistor Tr11 is preferably low. Thus, it is preferable to use an OS transistor, which has an extremely low off-state current, as the transistor Tr11. This can suppress a change in the potential of the node NM or the node NMref, so that the operation accuracy can be increased. Furthermore, operations of refreshing the potential of the node NM or the node NMref can be performed less frequently, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS has a function of supplying currents to the wirings BL[1] to BL[n] and the wiring BLref. Note that the value of the current supplied to the wirings BL[1] to BL[n] may be different from the value of the current supplied to the wiring BLref. Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref. Here, portions where the wirings IL[1] to IL[n] are connected to the respective wirings BL[1] to BL[n] are referred to as nodes NP[1] to NP[n]. Furthermore, a portion where the wiring ILref is connected to the wiring BLref is referred to as a node NPref.

The current mirror circuit CM has a function of making a current $I_{CM}$ corresponding to the potential of the node NPref flow to the wiring ILref and a function of making this current $I_{CM}$ flow also to the wirings IL[1] to IL[n]. In the example shown in FIG. 13, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuit CM to the cell array CA through the wirings BL[1] to BL[n] are denoted by $I_B[1]$ to $I_B[n]$. Furthermore, a current flowing from the current mirror circuit CM to the cell array CA through the wiring BLref is denoted by $I_{Bref}$.

The circuit WDD is connected to wirings WD[1] to WD[n] and the wiring WDref. The circuit WDD has a function of supplying a potential corresponding to the first data stored in the memory cells MC to the wirings WD[1] to WD[n]. The circuit WDD also has a function of supplying a potential corresponding to the reference data stored in the memory cells MCref to the wiring WDref. The circuit WLD is connected to wirings WL[1] to WL[m]. The circuit WLD has a function of supplying a signal for selecting the memory cell MC or the memory cell MCref to which data is to be written, to any of the wirings WL[1] to WL[m]. The circuit CLD is connected to wirings RW[1] to RW[m]. The circuit CLD has a function of supplying a potential corresponding to the second data to the wirings RW[1] to RW[m].

The offset circuit OFST is connected to the wirings BL[1] to BL[n] and wirings OL[1] to OL[n]. The offset circuit OFST has a function of detecting the amount of current flowing from the wirings BL[1] to BL[n] to the offset circuit OFST and/or the amount of change in the current flowing from the wirings BL[1] to BL[n] to the offset circuit OFST. The offset circuit OFST also has a function of outputting detection results to the wirings OL[1] to OL[n]. Note that the offset circuit OFST may output currents corresponding to the detection results to the wirings OL, or may convert the currents corresponding to the detection results into voltages to output the voltages to the wirings OL. The currents flowing between the cell array CA and the offset circuit OFST are denoted by $I_\alpha[1]$ to $I_\alpha[n]$.

Figure 15:
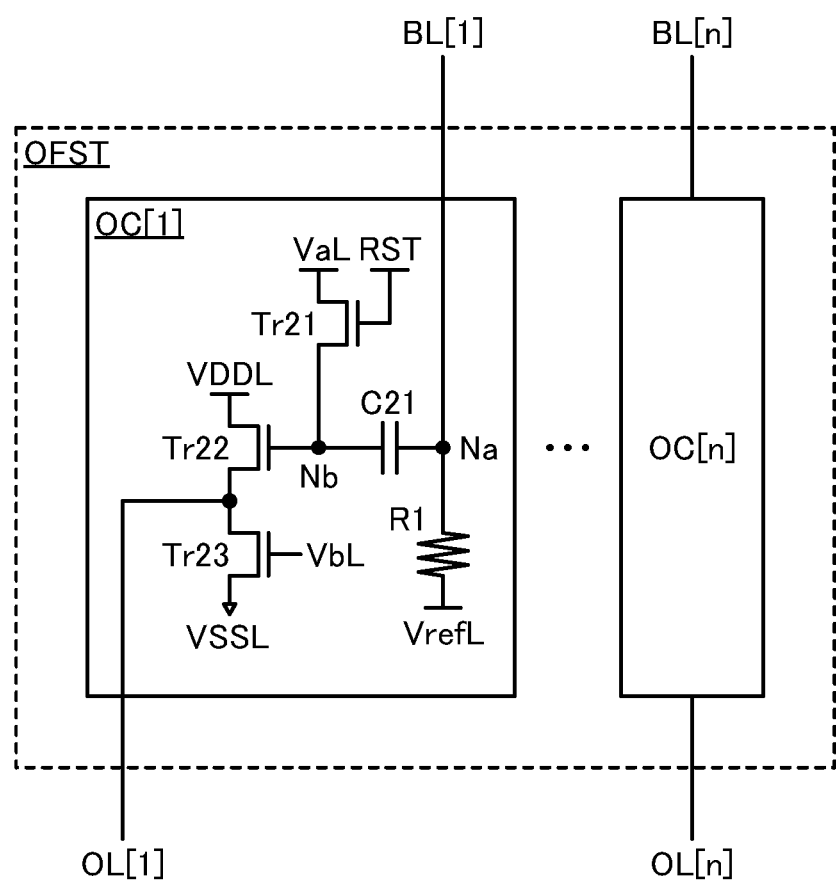
FIG. 15 A view illustrating a structure example of an offset circuit.

FIG. 15 shows a structure example of the offset circuit OFST. The offset circuit OFST shown in FIG. 15 includes circuits OC[1] to OC[n]. The circuits OC[1] to OC[n] each include a transistor Tr21, a transistor Tr22, a transistor Tr23, a capacitor C21, and a resistor R1. Connection relationships of the elements are shown in FIG. 15. Note that a node connected to a first electrode of the capacitor C21 and a first terminal of the resistor R1 is referred to as a node Na. In addition, a node connected to a second electrode of the capacitor C21, one of a source and a drain of the transistor Tr21, and a gate of the transistor Tr22 is referred to as a node Nb.

A wiring VretL has a function of supplying a potential Vref, a wiring VaL has a function of supplying a potential Va, and a wiring VbL has a function of supplying a potential Vb. Furthermore, a wiring VDDL has a function of supplying a potential VDD, and a wiring VSSL has a function of supplying a potential VSS. Here, the case where the potential VDD is a high power source potential and the potential VSS is a low power source potential is described. A wiring RST has a function of supplying a potential for controlling the conduction state of the transistor Tr21. The transistor Tr22, the transistor Tr23, the wiring VDDL, the wiring VSSL, and the wiring VbL form a source follower circuit.

Next, an operation example of the circuits OC[1] to OC[n] is described. Note that although an operation example of the circuit OC[1] is described here as a typical example, the circuits OC[2] to OC[n] can operate in a similar manner. First, when a first current flows to the wiring BL[1], the potential of the node Na becomes a potential corresponding to the first current and the resistance value of the resistor R1. At this time, the transistor Tr21 is in an on state, and thus the potential Va is supplied to the node Nb. Then, the transistor Tr21 is brought into an off state.

Next, when a second current flows to the wiring BL[1], the potential of the node Na changes to a potential corresponding to the second current and the resistance value of the resistor R1. At this time, since the transistor Tr21 is in an off state and the node Nb is in a floating state, the potential of the node Nb changes because of capacitive coupling, following the change in the potential of the node Na. Here, when the amount of change in the potential of the node Na is $\Delta V_{Na}$ and the capacitive coupling coefficient is 1, the potential of the node Nb is Va+$\Delta V_{Na}$. When the threshold voltage of the transistor Tr22 is $V_{th}$, a potential Va+$\Delta V_{Na}$−$V_{th}$ is output from the wiring OL[1]. Here, when Va=$V_{th}$, a potential $\Delta V_{Na}$ can be output from the wiring OL[1].

The potential $\Delta V_{Na}$ is determined by the amount of change from the first current to the second current, the resistance value of the resistor R1, and the potential Vref. Here, since the resistance value of the resistor R1 and the potential Vref are known, the amount of change in the current flowing to the wiring BL can be found from the potential $\Delta V_{Na}$.

A signal corresponding to the amount of current and/or the amount of change in the current detected by the offset circuit OFST as described above is input to the activation function circuit ACTV through the wirings OL[1] to OL[n].

The activation function circuit ACTV is connected to the wirings OL[1] to OL[n] and wirings NIL[1] to NIL[n]. The activation function circuit ACTV has a function of performing an operation for converting the signal input from the offset circuit OFST in accordance with a predefined activation function. As the activation function, a sigmoid function, a tanh function, a softmax function, a ReLU function, a threshold function, or the like can be used, for example. The signal converted by the activation function circuit ACTV is output as output data to the wirings NIL[1] to NIL[n].

Operation Example of Semiconductor Device

The product-sum operation of the first data and the second data can be performed with the above semiconductor device MAC. An operation example of the semiconductor device MAC at the time of performing the product-sum operation is described below.

Figure 16:
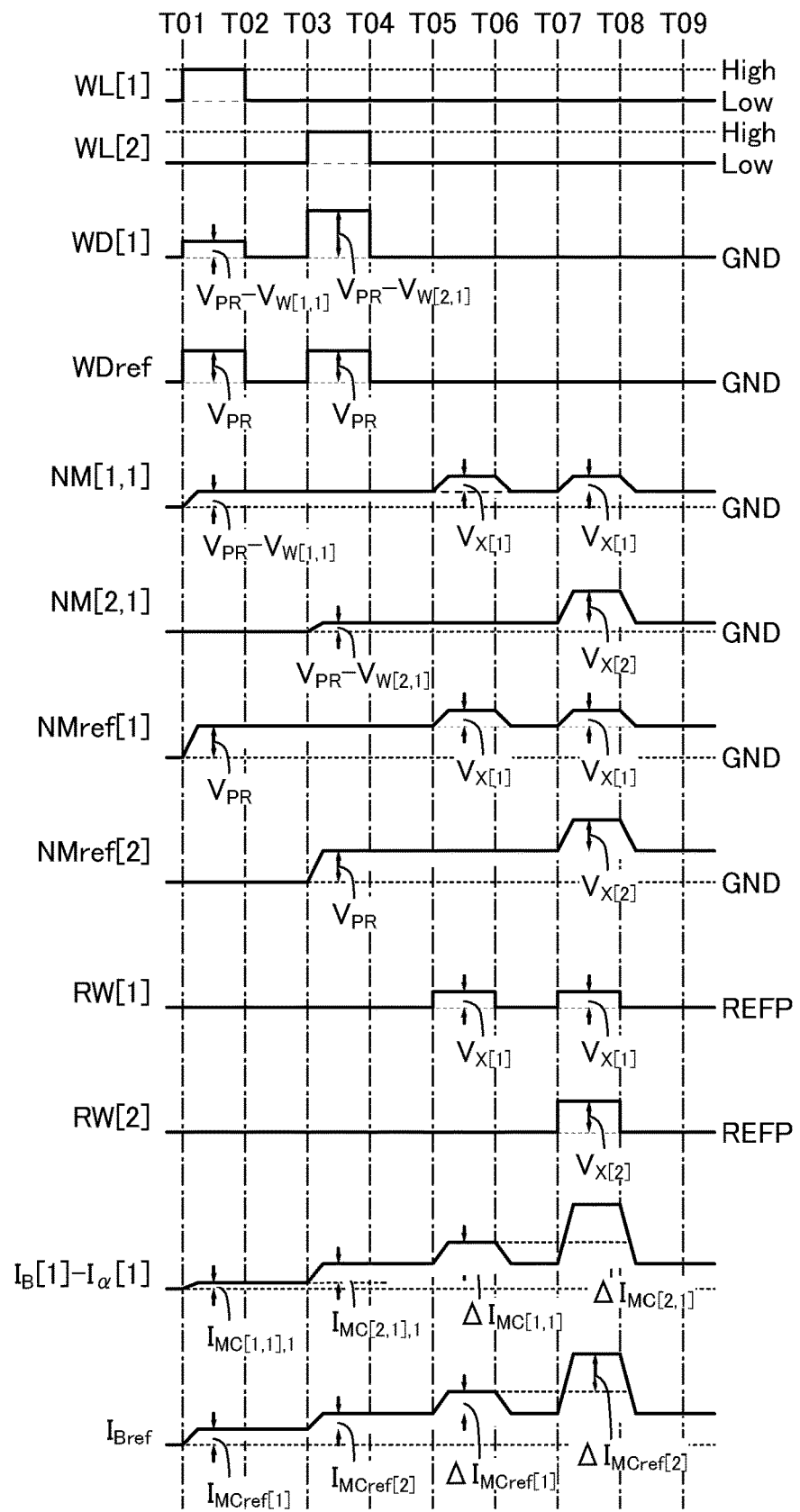
FIG. 16 A timing chart.

FIG. 16 shows a timing chart of the operation example of the semiconductor device MAC. FIG. 16 shows changes in the potentials of the wiring WL[1], the wiring WL[2], the wiring WD[1], the wiring WDref, the node NM[1, 1], the node NM[2, 1], the node NMref[1], the node NMref[2], and the wiring RW[1], and the wiring RW[2] in FIG. 14 and changes in the values of the current $I_B[1]-I_\alpha[1]$ and the current $I_{Bref}$. The current $I_B[1]-I_\alpha[1]$ corresponds to a total of the currents flowing from the wiring BL[1] to the memory cells MC[1, 1] and MC[2, 1].

Although an operation is described with a focus on the memory cells MC[1, 1] and MC[2, 1] and the memory cells MCref[1] and MCref[2] shown in FIG. 14 as a typical example, the other memory cells MC and the other memory cells MCref can also be operated in a similar manner.

[Storage of First Data]

First, from Time T01 to Time T02, the potential of the wiring WL[1] becomes a high level (High), the potential of the wiring WD[1] becomes a potential greater than a ground potential (GND) by $V_{PR}-V_{W[1,1]}$, and the potential of the wiring WDref becomes a potential greater than the ground potential by $V_{PR}$. The potentials of the wiring RW[1] and the wiring RW[2] become reference potentials (REFP). Note that the potential $V_{W[1,1]}$ is the potential corresponding to the first data stored in the memory cell MC[1, 1]. The potential $V_{PR}$ is the potential corresponding to the reference data. Thus, the transistors Tr11 included in the memory cell MC[1, 1] and the memory cell MCref[1] are turned on, and the potential of the node NM[1, 1] and the potential of the node NMref[1] become $V_{PR}-V_{W[1,1]}$ and $V_{PR}$, respectively.

In this case, a current $I_{MC[1,1],0}$ flowing from the wiring BL[1] to the transistor Tr12 in the memory cell MC[1, 1] can be expressed by the formula shown below. Here, k is a constant determined by the channel length, the channel width, the mobility, the capacitance of a gate insulating film, and the like of the transistor Tr12. Furthermore, $V_{th}$ is the threshold voltage of the transistor Tr12.

$$I_{MC[1,1],0}=k(V_{PR}-V_{W[1,1]}-V_{th})^2 \quad (E1)$$

Furthermore, a current $I_{MCref[1],0}$ flowing from the wiring BLref to the transistor Tr12 in the memory cell MCref[1] can be expressed by the formula shown below.

$$I_{MCref[1],0}=k(V_{PR}-V_{th})^2 \quad (E2)$$

Next, from Time T02 to Time T03, the potential of the wiring WL[1] becomes a low level (Low). Consequently, the transistors Tr11 included in the memory cell MC[1, 1] and the memory cell MCref[1] are turned off, and the potentials of the node NM[1, 1] and the node NMref[1] are retained.

As described above, an OS transistor is preferably used as the transistor Tr11. This can suppress the leakage current of the transistor Tr11, so that the potentials of the node NM[2, 1] and the node NMref[2] can be accurately retained.

Next, from Time T03 to Time T04, the potential of the wiring WL[2] becomes the high level, the potential of the wiring WD[1] becomes a potential greater than the ground potential by $V_{PR}-V_{W[2, 1]}$, and the potential of the wiring WDref becomes a potential greater than the ground potential by $V_{PR}$. Note that the potential $V_{W[2, 1]}$ is a potential corresponding to the first data stored in the memory cell MC[2, 1]. Thus, the transistors Tr11 included in the memory cell MC[2,1] and the memory cell MCref[2] are turned on, and the potentials of the node NM[2, 1] and the node NMref[2] become $V_{PR}-V_{W[2, 1]}$ and $V_{PR}$, respectively.

Here, a current $I_{MC[2, 1], 0}$ flowing from the wiring BL[1] to the transistor Tr12 in the memory cell MC[2, 1] can be expressed by the formula shown below.

$$I_{MC[2,1],0}=k(V_{PR}-V_{W[2,1]}-V_{th})^2 \quad (E3)$$

Furthermore, a current $I_{MCref[2], 0}$ flowing from the wiring BLref to the transistor Tr12 in the memory cell MCref[2] can be expressed by the formula shown below.

$$I_{MCref[2],0}=k(V_{PR}-V_{th})^2 \quad (E4)$$

Next, from Time T04 to Time T05, the potential of the wiring WL[2] becomes the low level. Consequently, the transistors Tr11 included in the memory cell MC[2, 1] and the memory cell MCref[2] are turned off, and the potentials of the node NM[2, 1] and the node NMref[2] are retained.

Through the above operation, the first data is stored in the memory cells MC[1, 1] and MC[2, 1], and the reference data is stored in the memory cells MCref[1] and MCref[2].

Here, currents flowing through the wiring BL[1] and the wiring BLref from Time T04 to Time T05 are considered. A current is supplied from the current source circuit CS to the wiring BLref. The current flowing through the wiring BLref is discharged to the current mirror circuit CM and the memory cells MCref[1] and MCref[2]. The formula shown below holds where $I_{Cref}$ is the current supplied from the current source circuit CS to the wiring BLref and $I_{CM, 0}$ is the current discharged from the wiring BLref to the current mirror circuit CM.

$$I_{Cref}-I_{CM,0}=I_{MCref[1],0}+I_{MCref[2],0} \quad (E5)$$

A current is supplied from the current source circuit CS to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. The formula shown below holds where $I_{C, 0}$ is the current supplied from the current source circuit CS to the wiring BL[1] and $I_{\alpha, 0}$ is the current flowing from the wiring BL[1] to the offset circuit OFST.

$$I_C-I_{CM,0}=I_{MC[1,1],0}+I_{MC[2,1],0}+I_{\alpha,0} \quad (E6)$$

[Product-Sum Operation of First Data and Second Data]

Next, from Time T05 to Time T06, the potential of the wiring RW[1] becomes a potential greater than the reference potential by $V_{X[1]}$. At this time, the potential $V_{X[1]}$ is supplied to the capacitors C11 in the memory cell MC[1, 1] and the memory cell MCref[1], so that the potentials of the gates of the transistors Tr12 increase owing to capacitive coupling. Note that the potential $V_{X[1]}$ is the potential corresponding to the second data supplied to the memory cell MC[1, 1] and the memory cell MCref[1].

The amount of change in the potential of the gate of the transistor Tr12 corresponds to the value obtained by multiplying the amount of change in the potential of the wiring RW by a capacitive coupling coefficient determined by the memory cell structure. The capacitive coupling coefficient is calculated using the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is 1. In practice, the potential Vx can be determined in consideration of the capacitive coupling coefficient.

When the potential $V_{X[1]}$ is supplied to the capacitors C11 in the memory cell MC[1, 1] and the memory cell MCref[1], the potentials of the node NM[1, 1] and the node NMref[1] each increase by $V_{X[1]}$.

Here, a current $I_{MC[1, 1], 1}$ flowing from the wiring BL[1] to the transistor Tr12 in the memory cell MC[1, 1] from Time T05 to Time T06 can be expressed by the formula shown below.

$$I_{MC[1,1],1} = k(V_{PR} - V_{W[1,1]} + V_{X[1]} - V_{th})^2 \quad (E7)$$

That is, when the potential $V_{X[1]}$ is supplied to the wiring RW[1], the current flowing from the wiring BL[1] to the transistor Tr12 in the memory cell MC[1, 1] increases by $\Delta I_{MC[1,1]} = I_{MC[1, 1], 1} - I_{MC[1, 1], 0}$.

A current $I_{MCref[1], 1}$ flowing from the wiring BLref to the transistor Tr12 in the memory cell MCref[1] from Time T05 to Time T06 can be expressed by the formula shown below.

$$I_{MCref[1],1} = k(V_{PR} + V_{X[1]} - V_{th})^2 \quad (E8)$$

That is, when the potential $V_{X[1]}$ is supplied to the wiring RW[1], the current flowing from the wiring BLref to the transistor Tr12 in the memory cell MCref[1] increases by $\Delta I_{MCref[1]} = I_{MCref[1], 1} - I_{MCref[1], 0}$.

Furthermore, currents flowing through the wiring BL[1] and the wiring BLref are considered. A current $I_{Cref}$ is supplied from the current source circuit CS to the wiring BLref. The current flowing through the wiring BLref is discharged to the current mirror circuit CM and the memory cells MCref[1] and MCref[2]. The formula shown below holds where $I_{CM, 1}$ is the current discharged from the wiring BLref to the current mirror circuit CM.

$$I_{Cref} - I_{CM,1} = I_{MCref[1],1} + I_{MCref[2],1} \quad (E9)$$

The current $I_C$ from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. The formula shown below holds where $I_{\alpha,1}$ is the current flowing from the wiring BL[1] to the offset circuit OFST.

$$I_C - I_{CM,1} = I_{MC[1,1],1} + I_{MC[2,1],1} + I_{\alpha,1} \quad (E10)$$

In addition, from the formula (E1) to the formula (E10), a difference between the current $I_{\alpha, 0}$ and the current $I_{\alpha,1}$ (differential current $\Delta I_\alpha$) can be expressed by the formula shown below.

$$\Delta I_\alpha = I_{\alpha,1} - I_{\alpha,0} = 2k V_{W[1,1]} V_{X[1]} \quad (E11)$$

Thus, the differential current $\Delta I_\alpha$ is a value corresponding to the product of the potentials $V_{W[1,1]}$ and $V_{X[1]}$.

After that, from Time T06 to Time T07, the potential of the wiring RW[1] becomes the reference potential, and the potentials of the node NM[1, 1] and the node NMref[1] become similar to the potentials thereof from Time T04 to Time T05.

Next, from Time T07 to Time T08, the potential of the wiring RW[1] becomes the potential greater than the reference potential by $V_{X[1]}$, and the potential of the wiring RW[2] becomes a potential greater than the reference potential by $V_{X[2]}$. Accordingly, the potential $V_{X[1]}$ is supplied to the capacitors C11 in the memory cell MC[1, 1] and the memory cell MCref[1], and the potentials of the node NM[1, 1] and the node NMref[1] each increase by $V_{X[1]}$ due to capacitive coupling. Furthermore, the potential $V_{X[2]}$ is supplied to the capacitors C11 in the memory cell MC[2, 1] and the memory cell MCref[2], and the potentials of the node NM[2, 1] and the node NMref[2] each increase by $V_{X[2]}$ due to capacitive coupling.

Here, the current $I_{MC[2, 1], 1}$ flowing from the wiring BL[1] to the transistor Tr12 in the memory cell MC[2, 1] from Time T07 to Time T08 can be expressed by the formula shown below.

$$I_{MC[2,1],1} = k(V_{PR} - V_{W[2,1]} + V_{X[2]} - V_{th})^2 \quad (E12)$$

That is, when the potential $V_{X[2]}$ is supplied to the wiring RW[2], the current flowing from the wiring BL[1] to the transistor Tr12 in the memory cell MC[2, 1] increases by $\Delta I_{MC[2,1]} = I_{MC[2, 1], 1} - I_{MC[2, 1], 0}$.

Here, a current $I_{MCref[2], 1}$ flowing from the wiring BLref to the transistor Tr12 in the memory cell MCref[2] from Time T07 to Time T08 can be expressed by the formula shown below.

$$I_{MCref[2],1} = k(V_{PR} + V_{X[2]} - V_{th})^2 \quad (E13)$$

That is, when the potential $V_{X[2]}$ is supplied to the wiring RW[2], the current flowing from the wiring BLref to the transistor Tr12 in the memory cell MCref[2] increases by $\Delta I_{MCref[2]} = I_{MCref[12], 1} - I_{MCref[2], 0}$.

Furthermore, currents flowing through the wiring BL[1] and the wiring BLref are considered. The current $I_{Cref}$ is supplied from the current source circuit CS to the wiring BLref. The current flowing through the wiring BLref is discharged to the current mirror circuit CM and the memory cells MCref[1] and MCref[2]. The formula shown below holds where $I_{CM, 2}$ is the current discharged from the wiring BLref to the current mirror circuit CM.

$$I_{Cref} - I_{CM,2} = I_{MCref[1],1} + I_{MCref[2],1} \quad (E14)$$

The current $I_C$ is supplied from the current source circuit CS to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. The formula shown below holds where $I_{\alpha, 2}$ is the current flowing from the wiring BL[1] to the offset circuit OFST.

$$I_C - I_{CM,2} = I_{MC[1,1],1} + I_{MC[2,1],1} + I_{\alpha,2} \quad (E15)$$

In addition, from the formula (E1) to the formula (E8) and the formula (E12) to the formula (E15), a difference between the current $I_{\alpha, 0}$ and the current $I_{\alpha, 2}$ (differential current $\Delta I_\alpha$) can be expressed by the formula shown below.

$$\Delta I_\alpha = I_{\alpha,2} - I_{\alpha,0} = 2k(V_{W[1,1]} V_{X[1]} + V_{W[2,1]} V_{X[2]}) \quad (E16)$$

Thus, the differential current $\Delta I_\alpha$ is a value corresponding to the sum of the product of the potential $V_{W[1, 1]}$ and the potential $V_{X[1]}$ and the product of the potential $V_{W[2, 1]}$ and the potential $V_{X[2]}$.

After that, from Time T08 to Time T09, the potentials of the wirings RW[1] and RW[2] become the reference potential, and the potentials of the nodes NM[1, 1] and NM[2, 1] and the nodes NMref[1] and NMref[2] become similar to the potentials thereof from Time T04 to Time T05.

As represented by the formula (E11) and the formula (E16), the differential current $\Delta I_\alpha$ input to the offset circuit OFST can be calculated from the formula including a product term of the potential $V_W$ corresponding to the first data (weight) and the potential $V_X$ corresponding to the second data (input data). Thus, measurement of the differential current $\Delta I_\alpha$ with the offset circuit OFST gives the result of the product-sum operation of the first data and the second data.

Note that although the memory cells MC[1, 1] and MC[2, 1] and the memory cells MCref[1] and MCref[2] are particularly focused on in the above description, the number of the memory cells MC and the memory cells MCref can be freely set. In the case where the number m of rows of the memory cells MC and the memory cells MCref is a given number i, the differential current $\Delta I_\alpha$ can be expressed by the formula shown below.

$$\Delta I_\alpha = 2k\Sigma_i V_{W[i,1]} V_{X[i]} \tag{E17}$$

When the number n of columns of the memory cells MC and the memory cells MCref is increased, the number of product-sum operations executed in parallel can be increased.

The product-sum operation of the first data and the second data can be performed using the semiconductor device MAC as described above. Note that the use of the structure of the memory cells MC and the memory cells MCref in FIG. 14 allows the product-sum operation circuit to be formed of fewer transistors. Accordingly, the circuit scale of the semiconductor device MAC can be reduced.

In the case where the semiconductor device MAC is used for the operation in the neural network, the number m of rows of the memory cells MC can correspond to the number of pieces of input data supplied to one neuron and the number n of columns of the memory cells MC can correspond to the number of neurons. For example, the case where a product-sum operation using the semiconductor device MAC is performed in the middle layer HL shown in FIG. 12(A) is considered. In this case, the number m of rows of the memory cells MC can be set to the number of pieces of input data supplied from the input layer IL (the number of neurons in the input layer IL), and the number n of columns of the memory cells MC can be set to the number of neurons in the middle layer HL.

Note that there is no particular limitation on the structure of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), or the like.

The product-sum operation of the neural network can be performed using the semiconductor device MAC as described above. Furthermore, the memory cells MC and the memory cells MCref shown in FIG. 14 are used for the cell array CA, which can provide an integrated circuit with improved operation accuracy, lower power consumption, or a reduced circuit scale.

This embodiment can be combined with the description of the other embodiments as appropriate.

Embodiment 4

In this embodiment, an OS transistor of one embodiment of the present invention and a nonvolatile memory using the OS transistor are described. As the memory 132 described in the above embodiment, a nonvolatile memory that uses an OS transistor can be used.

An OS transistor will be described below.

A channel formation region of an OS transistor preferably includes a metal oxide. The metal oxide included in the channel formation region preferably contains indium (In). When the metal oxide included in the channel formation region is a metal oxide containing indium, the carrier mobility (electron mobility) of the OS transistor increases. The metal oxide included in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a plurality of the above-described elements may be used in combination as the element M. The element M is an element having high bonding energy with oxygen, for example. The element M is an element having higher bonding energy with oxygen than indium, for example. The metal oxide included in the channel formation region is preferably a metal oxide containing zinc (Zn). The metal oxide containing zinc is easily crystallized in some cases.

The metal oxide included in the channel formation region is not limited to a metal oxide containing indium. The semiconductor layer may be a metal oxide that does not contain indium and contains zinc, a metal oxide that contains gallium, a metal oxide that contains tin, or the like, e.g., zinc tin oxide or gallium tin oxide.

As the memory 132, a memory device that uses an OS transistor can be used. For example, a NOSRAM (registered trademark) or a DOSRAM (registered trademark) which are described below can be used.

A NOSRAM refers to a gain cell DRAM where a write transistor of a memory cell is an OS transistor. NOSRAM is an abbreviation for Nonvolatile Oxide Semiconductor RAM. A structure example of a NOSRAM is described below.

NOSRAM

Figure 17A:
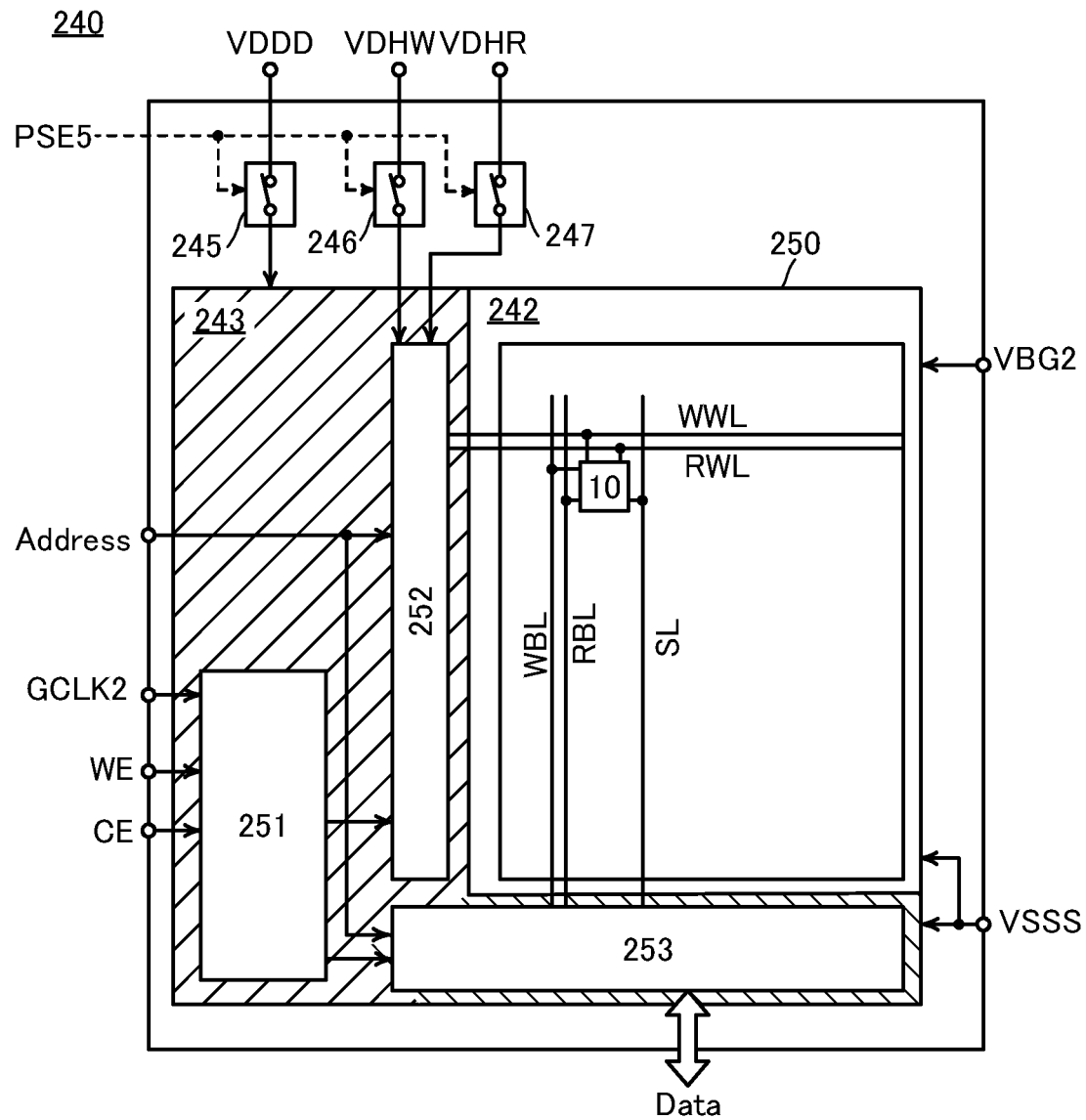
FIGS. 17A-17B A: a functional block diagram illustrating a structure example of a NOSRAM. B: a circuit diagram illustrating a structure example of a memory cell.

FIG. 17(A) is a block diagram showing a structure example of a NOSRAM. A NOSRAM 240 includes power domains 242 and 243 and power switches 245 to 247. A memory cell array 250 is provided in the power domain 242, and a peripheral circuit of the NOSRAM 240 is provided in the power domain 243. The peripheral circuit includes a control circuit 251, a row circuit 252, and a column circuit 253.

Voltages VDDD, VSSS, VDHW, VDHR, and VBG2, a clock signal GCLK2, an address signal (Address), and signals CE, WE, and PSE5 are input to the NOSRAM 240 from the outside. The signals CE and WE are a chip enable signal and a write enable signal, respectively. The signal PSE5 controls the on/off of the power switches 245 to 247. The power switches 245 to 247 control the input of the voltages VDDD, VDHW, and VDHR, respectively, to the power domain 243.

Note that the voltages, signals, and the like input to the NOSRAM 240 are selected as appropriate in accordance with the circuit structure and the operation method of the NOSRAM 240. For example, in the NOSRAM 240, a power domain in which power gating is not performed may be provided and a power gating control circuit that generates the signal PSE5 may be provided.

The memory cell array 250 includes a memory cell 10, a write word line WWL, a read word line RWL, a write bit line WBL, a read bit line RBL, and a source line SL.

Figure 17B:
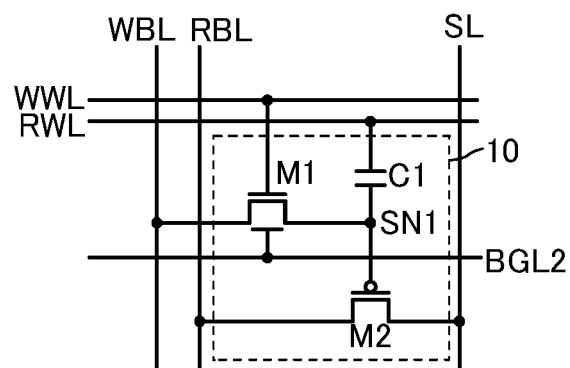

As shown in FIG. 17(B), the memory cell 10 is a 2T1C (two transistors and one capacitor) gain cell and includes a node SN1, transistors M1 and M2, and a capacitor C1. The transistor M1 is an OS transistor having a backgate and serving as a write transistor. The backgate of the transistor M1 is electrically connected to a wiring BGL2 that supplies a voltage VBG2. The transistor M2 is a read transistor and is also a p-channel Si transistor. The capacitor C1 is a storage capacitor that retains the voltage of the node SN1.

The voltages VDDD and VSSS represent data "1" and "0", respectively. Note that high-level voltages of the write word lines WWL and RWL are VDHW and VDHR, respectively.

Figure 18A:
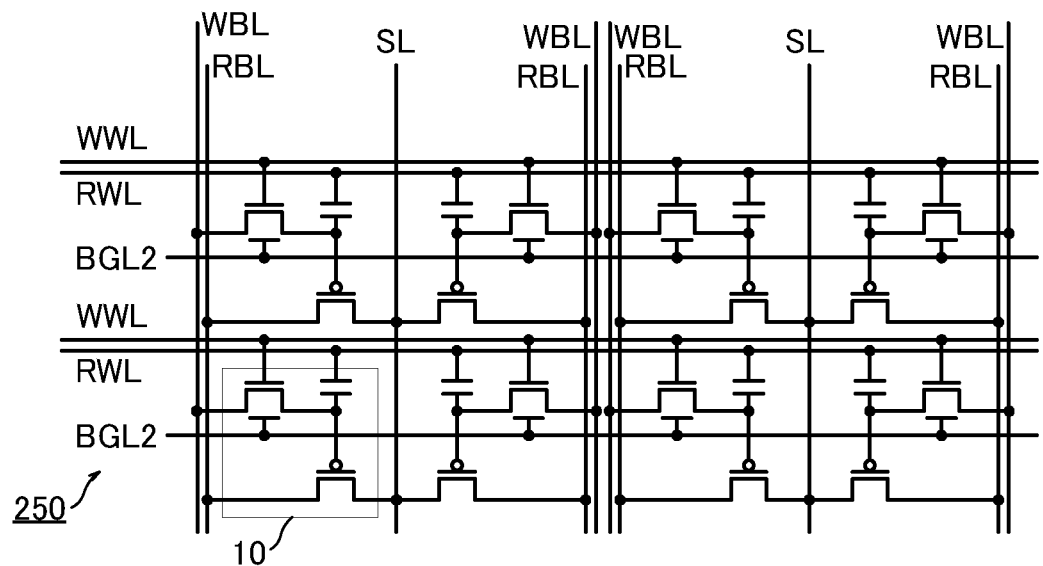
FIGS. 18A-18C A: a circuit diagram illustrating a structure example of a memory cell array. B, C: circuit diagrams illustrating structure examples of memory cells.

FIG. 18(A) shows a structure example of the memory cell array 250. In the memory cell array 250 shown in FIG. 18(A), one source line is supplied to the adjacent two rows.

The memory cell 10 does not have a limit on the number of times of rewriting in principle, can perform data rewriting with low energy, and does not consume power in retaining data. Since the transistor M1 is an OS transistor with an extremely low off-state current, the memory cell 10 can retain data for a long time. Thus, a cache memory device including the NOSRAM 240 can be a low-power nonvolatile memory device.

Figure 18B:
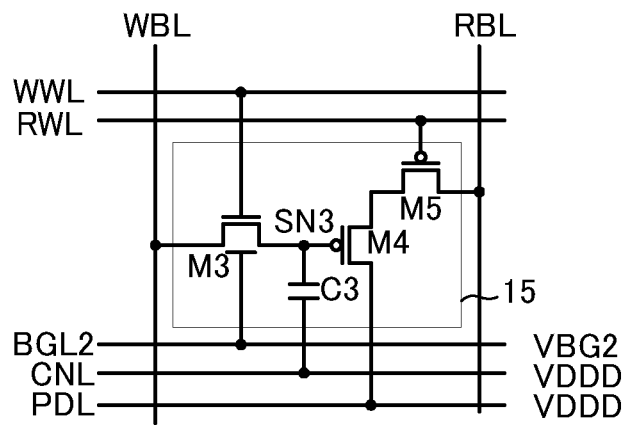
Figure 18C:
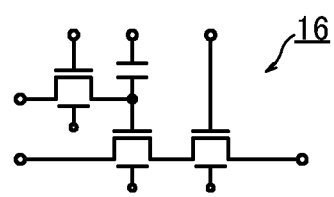

The circuit structure of the memory cell 10 is not limited to the circuit structure shown in FIG. 17(B). For example, the read transistor M2 may be an OS transistor having a backgate or an n-channel Si transistor. Alternatively, the memory cell 10 may be a 3T gain cell. For example, FIG. 18(B) and FIG. 18(C) show examples of a 3T gain cell. A memory cell 15 shown in FIG. 18(B) includes transistors M3 to M5, a capacitor C3, and a node SN3. The transistors M3 to M5 are a write transistor, a read transistor, and a selection transistor, respectively. The transistor M3 is an OS transistor having a backgate, and the transistors M4 and M5 are p-channel Si transistors. The transistors M4 and M5 may be n-channel Si transistors or OS transistors each having a backgate. In a memory cell 16 shown in FIG. 18(C), three transistors are OS transistors each having a backgate.

The node SN3 is a retention node. One electrode of the capacitor C3 is electrically connected to the node SN3 and has a function of retaining the voltage of the node SN3. The other electrode of the capacitor C3 is electrically connected to a wiring CNL. The capacitor C3 may be omitted intentionally, and the storage capacitor may be formed using gate capacitance of the transistor M4, or the like. A fixed voltage (e.g., VDDD) is input to a wiring PDL. The wiring PDL is an alternative to the source line SL, and a fixed voltage (e.g., the voltage VDDD) is input. The voltage VDDD is also input to the wiring CNL, for example.

The control circuit 251 has a function of controlling the entire operation of the NOSRAM 240. For example, the control circuit 251 performs logical operation of the signals CE and WE and determines whether access from the outside is write access or read access.

The row circuit 252 has a function of selecting the write word line WWL and the read word line RWL in the row specified and selected by the address signal. The column circuit 253 has a function of writing data to the write bit line WBL in the column specified by the address signal and a function of reading data from the read bit line RBL in that column.

DOSRAM

A DOSRAM refers to a RAM including a 1T1C memory cell and is an abbreviation for Dynamic Oxide Semiconductor RAM. A DOSRAM is described below with reference to FIG. 19.

Figure 19A:
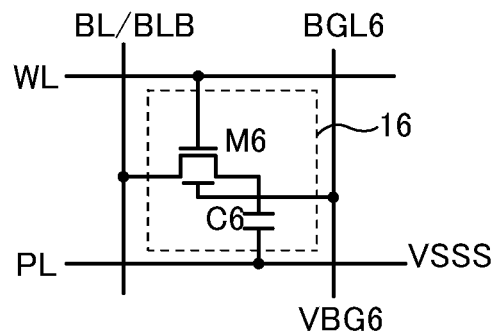
FIGS. 19A-19B A: a circuit diagram illustrating a structure example of a memory cell of a DOSRAM. B: a view illustrating an example of a stacked layer structure of a DOSRAM.

As illustrated in FIG. 19(A), the memory cell 16 of a DOSRAM 350 is electrically connected to a bit line BL (or BLB), a word line WL, and wirings BGL6 and PL. The bit line BLB is an inverted bit line; for example, voltages VBG6 and VSSS are input to the wirings BGL6 and PL. A transistor M6 and a capacitor C6 are included. The transistor M6 is an OS transistor including a backgate.

There is theoretically no limitation on the number of rewriting operations of the DOSRAM 350 because data is rewritten by charging and discharging of the capacitor C6; and data can be written and read with low energy. In addition, the memory cell 16 has a simple circuit structure, and thus the capacity can be easily increased. Since the write transistor of the memory cell 16 is an OS transistor, the retention time of the DOSRAM 350 is significantly longer than that of a DRAM. This allows less frequent refresh or makes refresh operations unnecessary; thus, the power needed for refresh operations can be reduced.

Figure 19B:
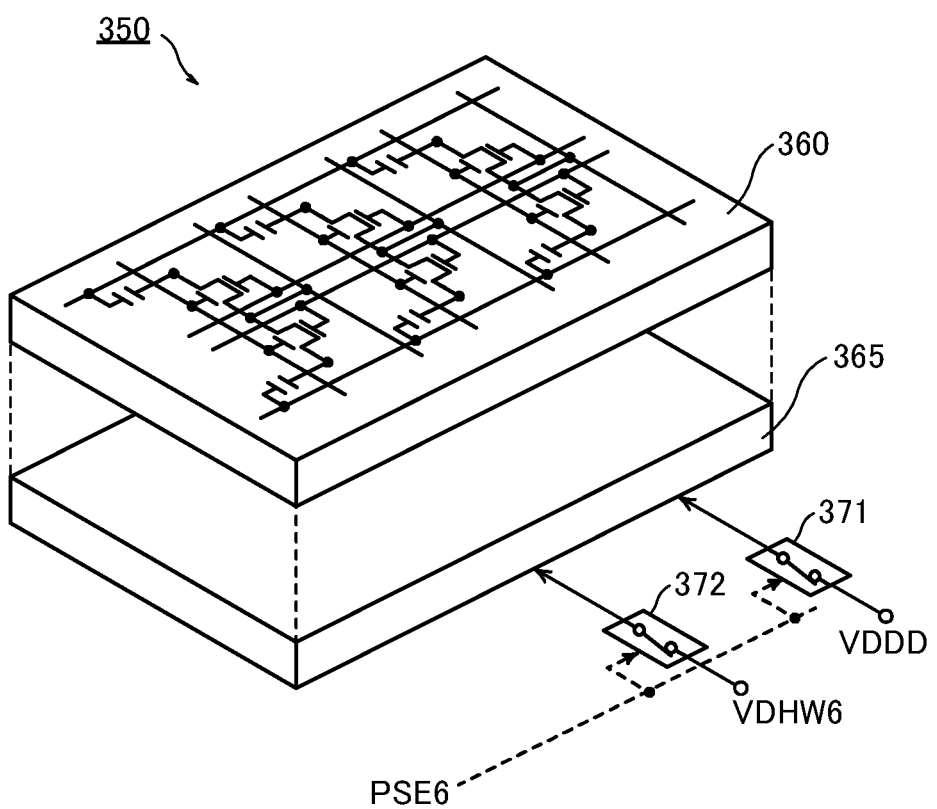

As illustrated in FIG. 19(B), in the DOSRAM 350, a memory cell array 360 can be stacked over a peripheral circuit 365. This is because the transistor M6 of the memory cell 16 is an OS transistor.

In the memory cell array 360, a plurality of memory cells 16 are arranged in a matrix, and the bit lines BL and BLB, the word line WL, and the wirings BGL6 and PL are provided according to the arrangement of the memory cells 16. The peripheral circuit 365 is provided with a control circuit, a row circuit, and a column circuit. The row circuit performs selection of a word line WL to be accessed, for example. The column circuit performs writing and reading of data to/from a bit line pair formed of BL and BLB, for example.

Power switches 371 and 372 are provided in order to power gate the peripheral circuit 365. The power switches 371 and 372 control input of a voltage VDDD and input of a voltage VDHW6, respectively, to the peripheral circuit 365. Note that the voltage VDHW6 is a high-level voltage for the word line WL. On/off of the power switches 371 and 372 is controlled with a signal PSE6. For example, the signal PSE6 is generated by a PMU 113.

This embodiment can be implemented in combination with the other embodiments as appropriate.

Embodiment 5

In this embodiment, examples of the electronic devices described in the above embodiments are described.

Figure 20A:
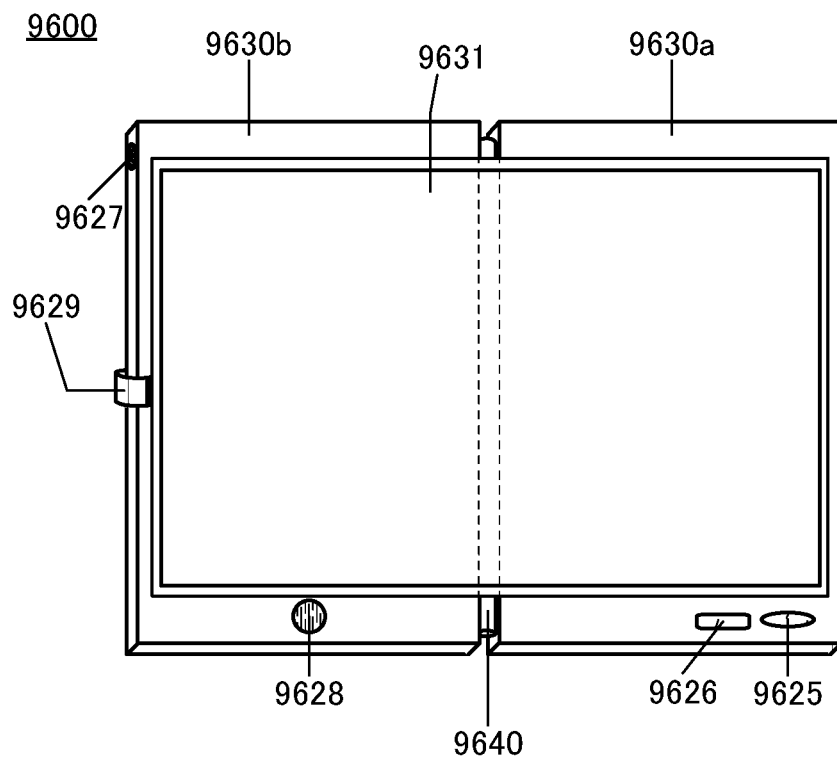
FIGS. 20A-20C An example of an electronic device.
Figure 20B:
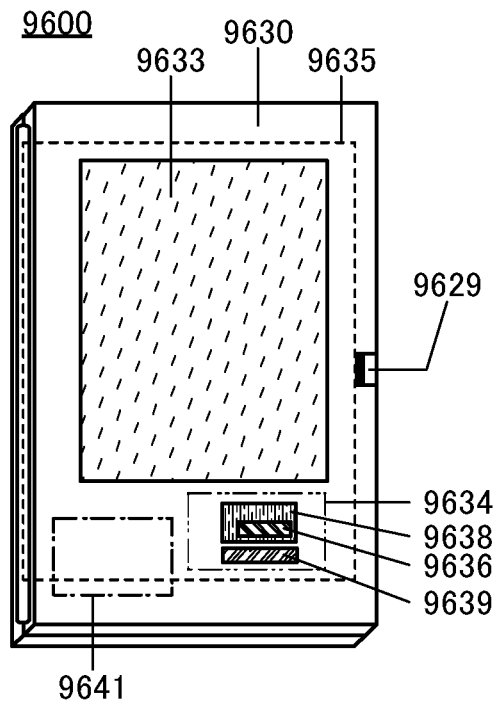

FIG. 20(A) and FIG. 20(B) show an example of a double-foldable tablet terminal. A tablet terminal 9600 shown in FIG. 20(A) and FIG. 20(B) includes a housing 9630*a*, a housing 9630*b*, a movable portion 9640 connecting the housing 9630*a* and the housing 9630*b*, a display portion 9631, a display mode changing switch 9626, a power switch 9627, a power saving mode changing switch 9625, a fastener 9629, and an operation switch 9628. The use of a flexible panel for the display portion 9631 enables a tablet terminal with a larger display portion. FIG. 20(A) shows the tablet terminal 9600 that is opened, and FIG. 20(B) shows the tablet terminal 9600 that is closed.

The tablet terminal 9600 includes a storage battery 9635 inside the housing 9630*a* and the housing 9630*b*. The storage battery 9635 is provided across the housing 9630*a* and the housing 9630*b*, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

The display mode changing switch 9626 can switch the display between a portrait mode and a landscape mode, and between monochrome display and color display, for example. The power saving mode changing switch 9625 can control display luminance in accordance with the amount of external light in use, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

FIG. 20(B) illustrates a closed state, and the tablet terminal 9600 includes the housing 9630, a solar cell 9633, the storage battery 9635, a coil 9641, and a control circuit 9634. The control circuit 9634 includes a protection circuit 9639 and a charging and discharging control circuit 9638 including a DC-DC converter 9636. Furthermore, the control circuit 9634 preferably includes an IC including a CPU, a GPU, a neural network, or the like, an IC having a function of controlling wireless power feeding via a coil, a communication module, or the like.

The tablet terminal 9600 can be folded in half and thus can be folded such that the housing 9630*a* and the housing 9630*b* overlap with each other when not in use. The display portion 9631 can be protected owing to the folding, which increases the durability of the tablet terminal 9600.

The tablet terminal shown in FIG. 20(A) and FIG. 20(B) can also have a function of displaying various kinds of data (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, can supply electric power to a touch panel, a display portion, an image signal processor, and the like. Note that the solar cell 9633 can be provided on one or both surfaces of the housing 9630 and the storage battery 9635 can be charged efficiently.

Figure 20C:
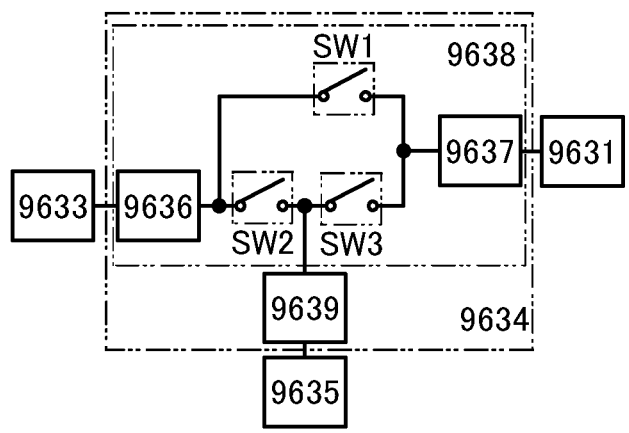

The structure and operation of the control circuit 9634 shown in FIG. 20(B) will be described with reference to a block diagram in FIG. 20(C). FIG. 20(C) shows the solar cell 9633, the storage battery 9635, the DC-DC converter 9636, a converter 9637, switches SW1 to SW3, and the display portion 9631; the DC-DC converter 9636, the converter 9637, and the switches SW1 to SW3 correspond to the charging and discharging control circuit 9638 shown in FIG. 20(B); and the charging and discharging control circuit 9638 and the protection circuit 9639 correspond to the control circuit 9634.

First, an example of the operation in the case where power is generated by the solar cell 9633 using external light is described. The voltage of electric power generated by the solar cell 9633 is raised or lowered by the DC-DC converter 9636 to a voltage for charging the storage battery 9635. When the electric power from the solar cell 9633 is used for the operation of the display portion 9631, the switch SW1 is turned on and the voltage of the electric power is raised or lowered by the converter 9637 to a voltage needed for the display portion 9631. When display on the display portion 9631 is not performed, SW1 is turned off and SW2 is turned on, so that the storage battery 9635 can be charged.

Note that the solar cell 9633 is described as an example of a power generation means; however, one embodiment of the present invention is not limited to this example. The storage battery 9635 may be charged using another power generation means such as a piezoelectric element or a thermoelectric conversion element (Peltier element). For example, charging may be performed with a non-contact power transmission module that transmits and receives electric power wirelessly (without contact), or with a combination of other charging means.

FIGS. 21(A) to 21(G) show examples of an electronic device of one embodiment of the present invention. Examples of an electronic device of one embodiment of the present invention include television devices (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

Figure 21A:
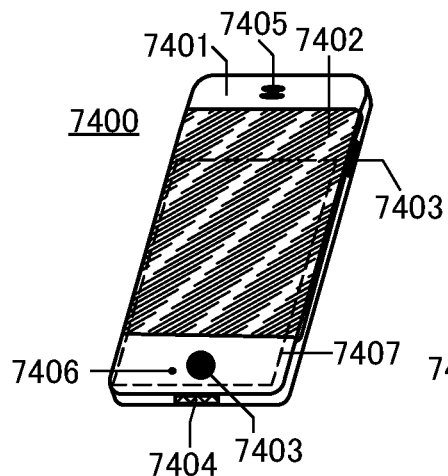
FIGS. 21A-21E Examples of an electronic device.

FIG. 21(A) shows an example of a mobile phone. A mobile phone 7400 is provided with operation buttons 7403, an external connection port 7404, a speaker 7405, a microphone 7406, and the like in addition to a display portion 7402 incorporated in a housing 7401.

Figure 21B:
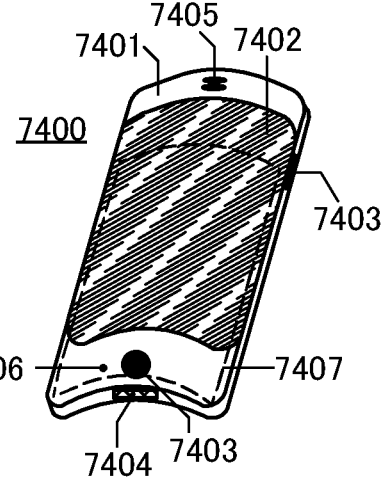
Figure 21C:
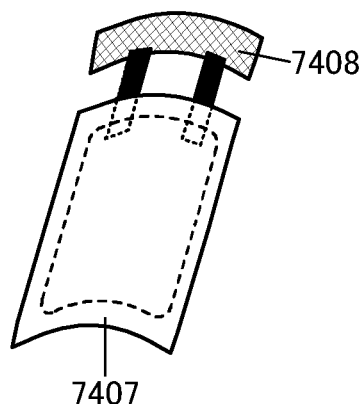

FIG. 21(B) shows the mobile phone 7400 that is bent. When the whole mobile phone 7400 is bent by external force, the storage battery 7407 provided therein may also be bent. In such a case, a flexible storage battery is preferably used as the storage battery 7407. FIG. 21(C) shows the flexible storage battery 7407 that is bent.

Furthermore, the mobile phone 7400 preferably includes an IC including a CPU, a GPU, a neural network, or the like, an IC having a function of controlling wireless power feeding via a coil, a communication module, or the like.

A flexible storage battery can also be incorporated along a curved inside/outside wall surface of a house or a building or a curved interior/exterior surface of an automobile.

Figure 21D:
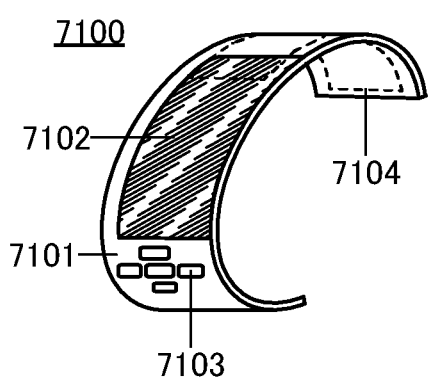

FIG. 21(D) illustrates an example of a bangle-type display device. A portable display device 7100 includes a housing 7101, a display portion 7102, operation buttons 7103, and a storage battery 7104. Furthermore, the mobile phone 7400 preferably includes an IC including a CPU, a GPU, a neural network, or the like, an IC having a function of controlling wireless power feeding via a coil, a communication module, or the like.

Figure 21E:
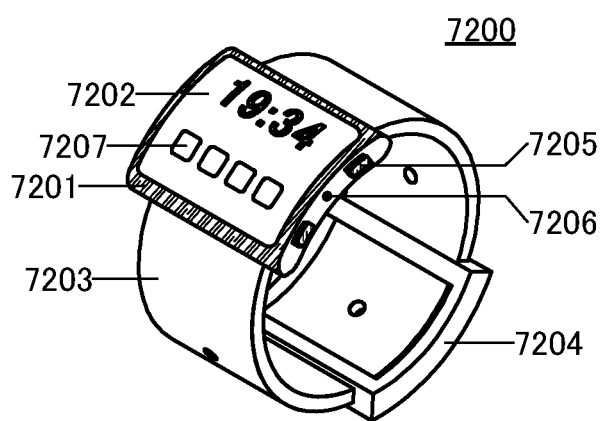

FIG. 21(E) shows an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and computer games.

The display surface of the display portion 7202 is curved, and images can be displayed on the curved display surface. The display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication based on an existing communication standard. For example, when mutual communication between the portable information terminal and a headset capable of wireless communication is performed, hands-free calling is possible.

The portable information terminal 7200 includes the input/output terminal 7206, and data can be directly transmitted to and received from another information terminal via a connector. In addition, charging via the input/output terminal 7206 is possible. The charging operation may be performed by wireless power feeding without using the input/output terminal 7206.

The portable information terminal 7200 includes a storage battery. Furthermore, the portable information terminal 7200 preferably includes an IC including a CPU, a GPU, a neural network, or the like, an IC having a function of controlling wireless power feeding via a coil, a communication module, or the like.

The portable information terminal 7200 preferably includes a sensor. As the sensor, for example, a human body sensor such as a fingerprint sensor, a pulse sensor, or a temperature sensor, a touch sensor, a pressure sensor, an acceleration sensor, or the like is preferably mounted.

This embodiment can be combined with the description of the other embodiments as appropriate.

REFERENCE NUMERALS

10: memory cell, 15: memory cell, 16: memory cell, 113: PMU, 120: electronic device, 120*a*: electronic device, 120*b*: electronic device, 132: memory, 133: server, 135: storage battery, 135*a*: storage battery, 135*b*: storage battery, 137: protection circuit, 139: housing, 140: power feeding device, 140*a*: power feeding device, 140*b*: power feeding device, 141: motor, 141*a*: motor, 141*b*: motor, 147: transistor, 148: transistor, 161: block, 162: adapter, 171: charge control circuit, 174: sensor element, 176: fuse, 182: control circuit, 183: coil, 183*a*: coil, 183*b*: coil, 185: coil, 186: control circuit, 187: position detection coil, 187*a*: position detection coil, 187*b*: position detection coil, 188: antenna, 189: antenna, 190: chip group, 191: IC, 192: IC, 193: IC, 194: memory, 195: memory, 240: NOSRAM, 242: power domain, 243: power domain, 245: power switch, 247: power switch, 250: memory cell array, 251: control circuit, 252: row circuit, 253: column circuit, 350: DOSRAM, 360: memory cell array, 365: peripheral circuit, 371: power switch, 372: power switch, 6200: information terminal, 6221*a*: housing, 6221*b*: housing, 6221*c*: housing, 6222: display portion, 6223*a*: operation button, 6223*b*: operation button, 6223*c*: operation button, 6224: speaker, 6226: camera, 6228: storage battery, 6229: coil, 6231: IC, 6232: IC, 6233: IC, 6234: memory, 6235: memory, 6236: antenna, 7100: portable display device, 7101: housing, 7102: display portion, 7103: operation button, 7104: storage battery, 7200: portable information terminal, 7201: housing, 7202: display portion, 7203: band, 7204: buckle, 7205: operation button, 7206: input/output terminal, 7207: icon, 7400: mobile phone, 7401: housing, 7402: display portion, 7403: operation button, 7404: external connection port, 7405: speaker, 7406: microphone, 7407: storage battery, 9600: tablet terminal, 9625: switch, 9626: switch, 9627: power switch, 9628: operation switch, 9629: fastener, 9630: housing, 9630*a*: housing, 9630*b*: housing, 9631: display portion, 9633: solar cell, 9634: control circuit, 9635: storage battery, 9636: DC-DC converter, 9637: converter, 9638: charging and discharging control circuit, 9639: protection circuit, 9640: movable portion, 9641: coil

What is claimed is:

1. A system comprising:
a storage battery;
a power feeding device;
a control circuit; and
a neural network,
wherein the storage battery is charged by the power feeding device,
wherein the power feeding device is configured to accumulate data, the data being linked with time,
wherein the data comprises a battery charge frequency, a charge start time, and a remaining capacity value of the storage battery at a timing when charging is started,
wherein the control circuit is configured to estimate a remaining capacity value of the storage battery on the basis of the accumulated data,
wherein the control circuit is configured to supply the estimated remaining capacity value to the neural network,
wherein the neural network is configured to infer a usage tendency of the battery capacity and determine a charge condition,
wherein the neural network outputs a value corresponding to the charge condition to the control circuit,
wherein when the charge condition is approved by a user, the control circuit is configured to charge the storage battery under the approved charge condition, and
wherein when the charge condition is not approved by the user, the power feeding device is supplied with a signal indicating non-approval.

2. The system according to claim 1, further comprising a memory,
wherein the memory comprises a transistor including a metal oxide containing indium in a channel formation region.

* * * * *